United States Patent
Kim et al.

(10) Patent No.: US 10,935,846 B2
(45) Date of Patent: Mar. 2, 2021

(54) LIQUID CRYSTAL DEVICE AND OPERATION METHOD THEREOF

(71) Applicant: Electronics and Telecommunications Research Institute, Daejeon (KR)

(72) Inventors: Gi Heon Kim, Daejeon (KR); Yong Hae Kim, Daejeon (KR); Chi-Sun Hwang, Daejeon (KR); Chi-Young Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 100 days.

(21) Appl. No.: 16/183,726

(22) Filed: Nov. 7, 2018

(65) Prior Publication Data

US 2019/0137799 A1 May 9, 2019

(30) Foreign Application Priority Data

Nov. 8, 2017 (KR) .................. 10-2017-0148286
Jun. 12, 2018 (KR) .................. 10-2018-0067717

(51) Int. Cl.
*G02F 1/1337* (2006.01)
*C09K 19/60* (2006.01)
(Continued)

(52) U.S. Cl.
CPC .......... *G02F 1/1337* (2013.01); *C09K 19/586* (2013.01); *C09K 19/60* (2013.01);
(Continued)

(58) Field of Classification Search
None
See application file for complete search history.

(56) References Cited

U.S. PATENT DOCUMENTS 5,343,318 A * 8/1994 Basturk ............. G02F 1/133711
349/122
5,475,515 A * 12/1995 Yoshinaga ........... C09K 19/544
349/74
(Continued)

FOREIGN PATENT DOCUMENTS

JP       2008-268566 A     11/2008
KR      10-0262256 B1      7/2000
(Continued)

*Primary Examiner* — Chanceity N Robinson
*Assistant Examiner* — Anna Malloy
(74) *Attorney, Agent, or Firm* — Rabin & Berdo, P.C.

(57) ABSTRACT

A liquid crystal device includes a first substrate and a second substrate facing each other, a first electrode disposed between the first substrate and the second substrate and adjacent to the first substrate, a second electrode disposed between the first substrate and the second substrate and adjacent to the second substrate, a first alignment film disposed between the first electrode and the second electrode and adjacent to the first electrode, a second alignment film disposed between the first electrode and the second electrode and adjacent to the second electrode, and a liquid crystal layer disposed between the first alignment film and the second alignment film, wherein the liquid crystal layer includes a liquid crystal portion containing liquid crystal molecules, and a hydrophobic portion containing a hydrophobic material, the liquid crystal portion and the hydrophobic portion are phase-separated from each other, and the hydrophobic portion includes fluorine.

18 Claims, 17 Drawing Sheets

(51) Int. Cl.
*C09K 19/58* (2006.01)
*G02F 1/1333* (2006.01)
*G02F 1/137* (2006.01)

(52) U.S. Cl.
CPC .......... *C09K 19/601* (2013.01); *C09K 19/603* (2013.01); *G02F 1/133377* (2013.01); *G02F 1/13725* (2013.01); *G02F 2001/133742* (2013.01)

(56) References Cited

U.S. PATENT DOCUMENTS

| | | | |
|---|---|---|---|
| 6,304,306 B1 * | 10/2001 | Shiomi | C09K 19/544 349/88 |
| 7,511,784 B2 | 3/2009 | Ushiro et al. | |
| 8,144,091 B2 | 3/2012 | Nose | |
| 8,268,109 B2 | 9/2012 | Hwang et al. | |
| 8,497,958 B2 | 7/2013 | Jang et al. | |
| 9,753,334 B2 | 9/2017 | Kim et al. | |
| 2013/0301110 A1 | 11/2013 | Kato et al. | |
| 2014/0168595 A1 * | 6/2014 | Kim | C09K 19/601 349/182 |
| 2015/0146134 A1 * | 5/2015 | Kim | C09K 19/60 349/62 |
| 2015/0362785 A1 | 12/2015 | Kim et al. | |
| 2017/0155894 A1 | 6/2017 | Lee et al. | |
| 2017/0176834 A1 | 6/2017 | Kim et al. | |
| 2017/0210995 A1 | 7/2017 | Kim et al. | |

FOREIGN PATENT DOCUMENTS

| | | |
|---|---|---|
| KR | 10-2006-0135817 A | 12/2006 |
| KR | 10-2011-0032639 A | 3/2011 |
| KR | 10-2012-0015190 A | 2/2012 |
| KR | 10-2013-0041718 A | 4/2013 |
| KR | 10-2013-0126502 A | 11/2013 |
| KR | 10-2017-0062294 A | 6/2017 |
| KR | 10-2017-0067325 A | 6/2017 |

* cited by examiner

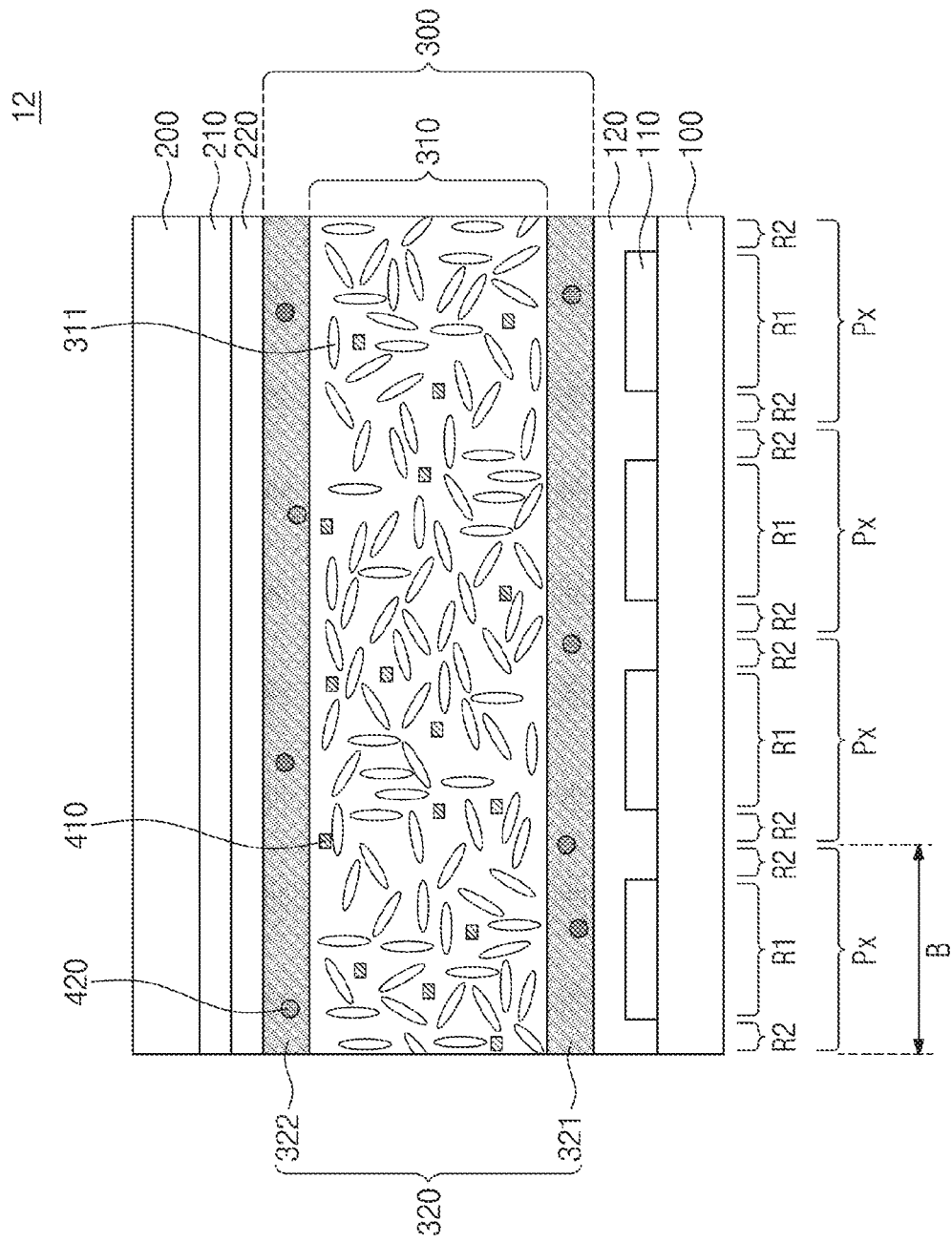

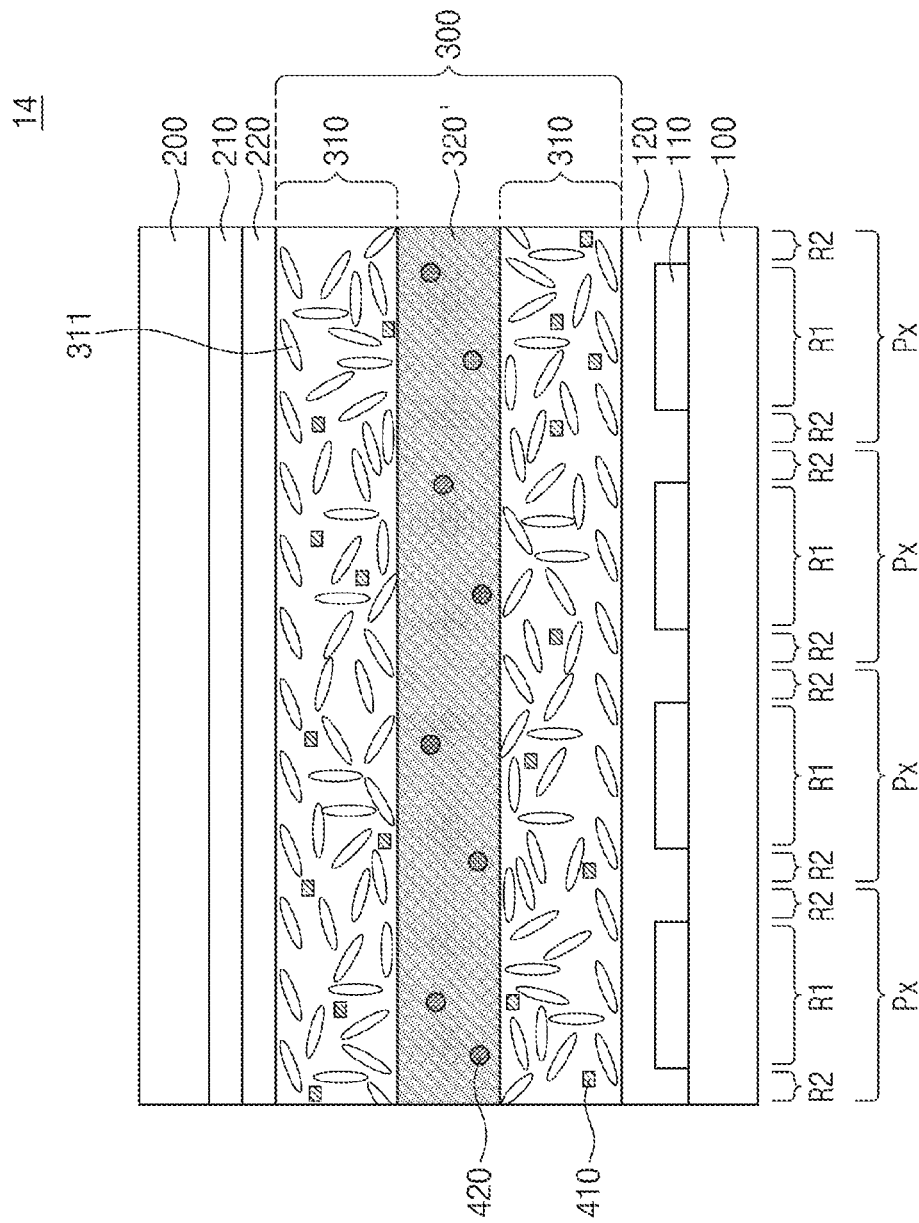

LIQUID CRYSTAL DEVICE AND OPERATION METHOD THEREOF

CROSS-REFERENCE TO RELATED APPLICATIONS

This U.S. non-provisional patent application claims priority under 35 U.S.C. § 119 of Korean Patent Application Nos. 10-2017-0148286, filed on Nov. 8, 2017, and 10-2018-0067717, filed on Jun. 12, 2018, the entire contents of which are hereby incorporated by reference.

BACKGROUND

The present disclosure herein relates to a liquid crystal device and an operation method thereof, and more particularly to a liquid crystal layer of a liquid crystal device.

Liquid crystals may be substances in a mesophase between crystals and liquids. The name liquid crystal is derived from properties of the liquidity of liquid and the anisotropy of crystal. Liquid crystals have order in the position and orientation of particles in a crystalline state. However, liquid crystals have a disordered position and orientation in a liquid state.

As a method of implementing a three-dimensional image, holography, stereoscopy, and integral imaging techniques are being developed. The holography method is known to be the most ideal method for users to feel stereoscopic images without fatigue. The holography method expresses the distance and the depth through the optical interference phenomenon. The holography method requires a spatial light modulator (SLM) and the SLM functions to adjust the transmittance of the incident light or to output the phase information of the light.

SUMMARY

The present disclosure is to provide a liquid crystal device with improved cross talk and an operation method thereof.

The present disclosure is also to provide a high-resolution liquid crystal device and an operation method thereof.

An embodiment of the inventive concept provides a liquid crystal device including: a first substrate and a second substrate facing each other; a first electrode disposed between the first substrate and the second substrate and adjacent to the first substrate; a second electrode disposed between the first substrate and the second substrate and adjacent to the second substrate; a first alignment film disposed between the first electrode and the second electrode and adjacent to the first electrode; a second alignment film disposed between the first electrode and the second electrode and adjacent to the second electrode; and a liquid crystal layer disposed between the first alignment film and the second alignment film, wherein the liquid crystal layer includes a liquid crystal portion containing liquid crystal molecules, and a hydrophobic portion containing a hydrophobic material, the liquid crystal portion and the hydrophobic portion are phase-separated from each other, and the hydrophobic portion contains fluorine.

In an embodiment, the hydrophobic material may have a molecular weight of 300-5,000.

In an embodiment, before a voltage is applied to the first electrode and the second electrode, the liquid crystal portion may include a first liquid crystal portion adjacent to the first alignment film and a second liquid crystal portion adjacent to the second alignment film, and the hydrophobic portion may be disposed between the first liquid crystal portion and the second liquid crystal portion.

In an embodiment, when a voltage is applied to the first electrode and the second electrode, the liquid crystal molecules may be vertically aligned between the first electrode and the second electrode, the hydrophobic portion may move toward a side of the first electrode or second electrode, only the liquid crystal portion may be positioned between the first electrode and the second electrode, and the liquid crystal portion may be disposed between the first electrode and the hydrophobic portion or between the second electrode and the hydrophobic portion.

In an embodiment, the liquid crystal device may further include a dye included in the liquid crystal portion or the hydrophobic portion.

In an embodiment, the dye may have an aromatic ring or a condensed ring.

In an embodiment, the liquid crystal portion may further include a dye, the dye having a yellow color, and having a structure of Chemical Formula 1 below, <Chemical Formula 1>

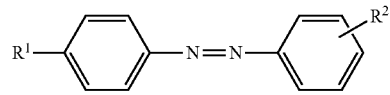

In Chemical Formula 1, $R^1$ is a dialkylamino group $\{-N(C_nH_{2n+1})\}$ where n is an integer of 1 or more$\}$, $R^2$ is hydrogen, a methyl group, an ethyl group, a linear or branched alkyl group having three or more carbon atoms, an alkenyl group having three or more carbon atoms, or an aromatic group.

In an embodiment, the liquid crystal portion may further include a dye, the dye having a magenta color, and having a structure of Chemical Formula 2 below.

<Chemical Formula 2>

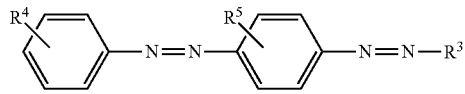

In Chemical Formula 2, $R^3$ may be one selected from Chemical Formula 3 below.

<Chemical Formula 3>

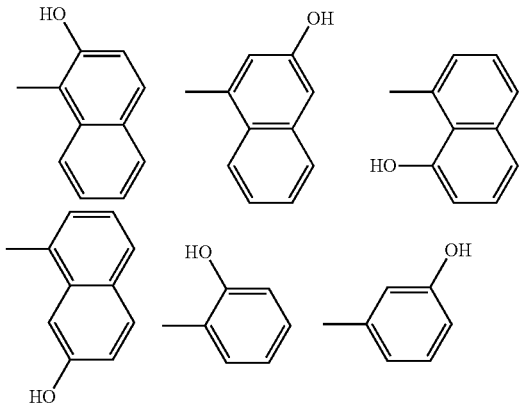

-continued

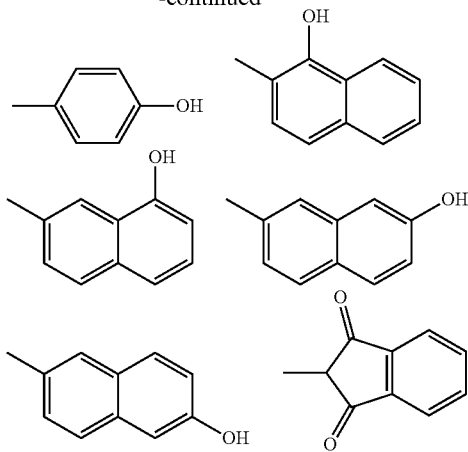

In Chemical Formula 3, $R^4$ and $R^5$ are each independently hydrogen, a methyl group, an ethyl group, a linear or branched alkyl group having three or more carbon atoms, an alkenyl group having three or more carbon atoms, or an aromatic group.

In an embodiment, the liquid crystal portion may further include a dye, the dye having a cyan color, and having a structure of Chemical Formula 4 below.

<Chemical Formula 4>

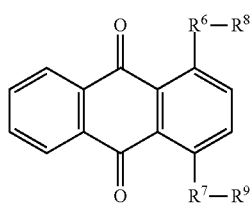

In Chemical Formula 4, $R^6$ and $R^7$ are each independently one selected from a group consisting of oxygen (O), sulfur (S), selenium (Se), a methylene group, —NH—, and an ester group, $R^8$ and $R^9$ are each independently hydrogen, a methyl group ($CH_3$), ethyl group ($C_2H_5$), a propyl group ($C_3H_7$), a butyl group ($C_4H_9$), a pentyl group ($C_5H_{11}$), a linear or branched alkyl group having six or more carbon atoms, a linear or branched alkenyl group having three or more carbon atoms, or an aromatic group.

In an embodiment, the liquid crystal portion may further include a dye, the dye being included in an amount of 0.001-5 wt % with respect to the total weight of the liquid crystal molecules.

In an embodiment, the first electrode may include a first pixel electrode, a second pixel electrode and a third pixel electrode, which are spaced apart from each other on the same plane. The liquid crystal device may further include: a first partition configured to penetrate the liquid crystal layer between the first pixel electrode and the second pixel electrode to divide the liquid crystal portion of the liquid crystal layer into a first pixel liquid crystal portion and a second pixel liquid crystal portion; and a second partition configured to penetrate the liquid crystal layer between the second pixel electrode and the third pixel electrode to divide the liquid crystal portion of the liquid crystal layer into the second pixel liquid crystal portion and a third pixel liquid crystal portion.

In an embodiment, the liquid crystal device may further include: a first dye included in the first pixel liquid crystal portion; a second dye included in the second pixel liquid crystal portion; and a third dye included in the third pixel liquid crystal portion, the first to third dyes being different from each other.

In an embodiment, the first to third pixel liquid crystal portions may respectively include optical active agents having different concentrations.

In an embodiment, the liquid crystal portion may further include an optical active agent, the optical active agent having a structure of Chemical Formula 5 below.

<Chemical Formula 5>

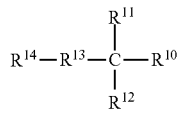

In Chemical Formula 5, $R^{10}$ is hydrogen, a methyl group or an ethyl group, $R^{11}$ is a hexyl group ($C_6H_{13}$), OCO, an aromatic group or an alicyclic group, $R^{12}$ is hydrogen, a methyl group, an ethyl group or argon, $R^{13}$ is CONH, COO, CN or OCO, and $R^{14}$ has a structure of X—B-A- where A and B are each independently a substitutable aromatic group or alicyclic group, and X is a linear, branched or cyclic aliphatic compound having 2-7 carbon atoms.

In an embodiment, the optical active agent may be included in an amount of 0.1-50 wt % with respect to the total weight of the liquid crystal molecules.

In an embodiment, the aromatic group may be at least one selected from the group consisting of a phenyl group, a naphthyl group, an anthryl group, a phenanthryl group, a heteroaromatic ring residue, or may be obtained by substituting a portion thereof with at least one selected from the group consisting of a methyl group, an ethyl group, a n-propyl group, fluorine, chlorine, bromine, $CF_3$ and $CCl_3$.

In an embodiment, the hydrophobic portion may have a lower dielectric constant than the liquid crystal portion.

The liquid crystal molecules may have a refractive index anisotropy of 0.1-0.3.

The liquid crystal molecules may have a dielectric anisotropy of 5-40.

The refractive index of the hydrophobic portion 320 may be 1.25 to 1.45.

In an embodiment of the inventive concept, an operation method of a liquid crystal device includes a first electrode, a liquid crystal layer, and a second electrode, which are stacked on a substrate, wherein the substrate has a plurality of pixel regions, each of the pixel regions includes a first region overlapping the first electrode and a second region spaced from the first electrode in a plan view, and the liquid crystal layer includes liquid crystal molecules and a hydrophobic portion that are phase-separated from each other, wherein the method includes: overlaying the hydrophobic portion with the first region and the second region of the substrate in a plan view; and separating the hydrophobic portion from the first region of the substrate in a plan view.

In an embodiment, the separating of the hydrophobic portion from the first region of the substrate may include generating a voltage difference between the first electrode and the second electrode.

In an embodiment, the separating of the hydrophobic portion from the first region of the substrate may further include aligning the liquid crystal molecules by the voltage difference.

In an embodiment, the aligned liquid crystal molecules may overlap the first region of the substrate in plan view.

In an embodiment, the overlaying the hydrophobic portion with the first region and the second region of the substrate may be performed without applying a voltage difference between the first electrode and the second electrode.

In an embodiment, the hydrophobic portion may have a dielectric constant of $\frac{1}{100}$ to $\frac{1}{2}$ of the liquid crystal molecules.

In an embodiment, an interval between the first substrate and the second substrate may be equal to or greater than the widths of the pixel regions.

In an embodiment, the liquid crystal element may further include: a first alignment film disposed between the first electrode and the liquid crystal layer; and a second alignment film disposed between the liquid crystal layer and the second electrode.

In an embodiment, the hydrophobic portion may be spaced apart from the first alignment film and the second alignment film, and the liquid crystal molecules may be provided between the hydrophobic portion and the first alignment film and between the hydrophobic portion and the second alignment film.

In an embodiment, the liquid crystal molecules may be spaced apart from the first alignment film and the second alignment film, and the hydrophobic portion may be in physical contact with the first alignment film and the second alignment film.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 3 is a cross-sectional view illustrating a liquid crystal device according to another embodiment of the inventive concept;

FIG. 6 is a cross-sectional view illustrating a liquid crystal device according to another embodiment of the inventive concept—hereinafter, the duplicated description as set forth above will be omitted;

DETAILED DESCRIPTION

Figure 1A:
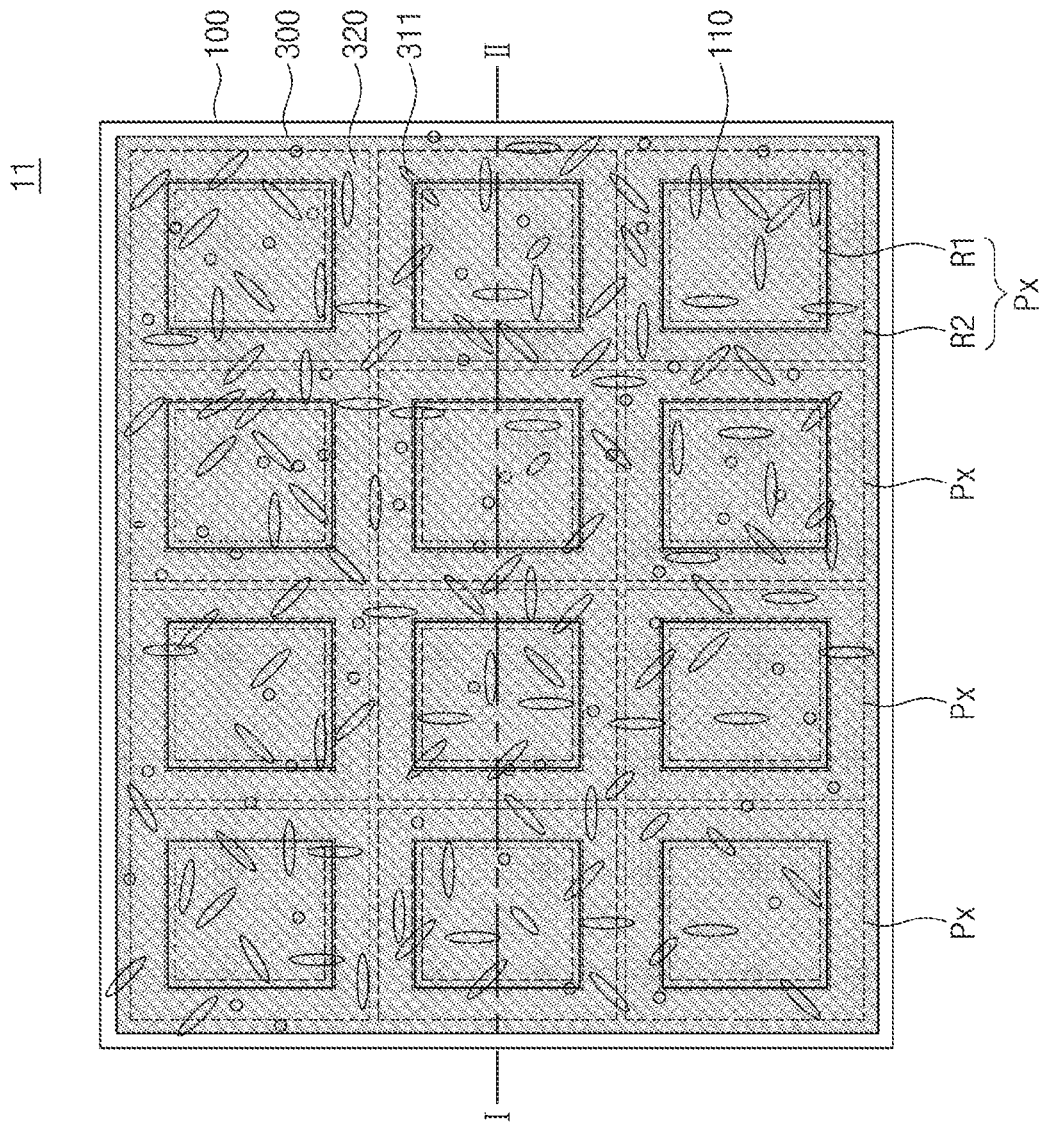
FIG. 1A is a plan view of a liquid crystal device according to an embodiment of the inventive concept.

In order to fully understand the configuration and effects of the technical spirit of inventive concept, preferred embodiments of the technical spirit of inventive concept will be described with reference to the accompanying drawings. However, the technical spirit of the inventive concept is not limited to the embodiments set forth herein and may be implemented in various forms and various modifications may be applied thereto. Only, the technical spirit of the inventive concept is disclosed to the full through the description of the embodiments, and it is provided to those skilled in the art that the inventive concept belongs to inform the scope of the inventive concept completely. Those of ordinary skill in the art will understand that the concepts of the inventive concept may be practiced in any suitable environment.

The terms used herein is to describe the embodiments and are not intended to limit the inventive concept. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

In this specification, when a film (or layer) is referred to as being on another film (or layer) or substrate, it may be directly on the other film (or layer) or substrate, or a third film (or layer) may be interposed.

It will be understood that the terms "first", "second", and "third" are used herein to describe various regions, films (or layers), and so on, but these regions, films (or layers), and so on should not be limited by these terms. These terms are only used to distinguish any predetermined region or film (or layer) from another region or film (or layer). Thus, a membrane referred to as a first membrane in one embodiment may be referred to as a second membrane in another embodiment. Embodiments described herein include complementary embodiments thereof. Like reference numerals refer to like components throughout the specification.

Unless otherwise the terms used in embodiments of the inventive concept are defined differently, they may be interpreted as commonly known to those skilled in the art.

Figure 1B:
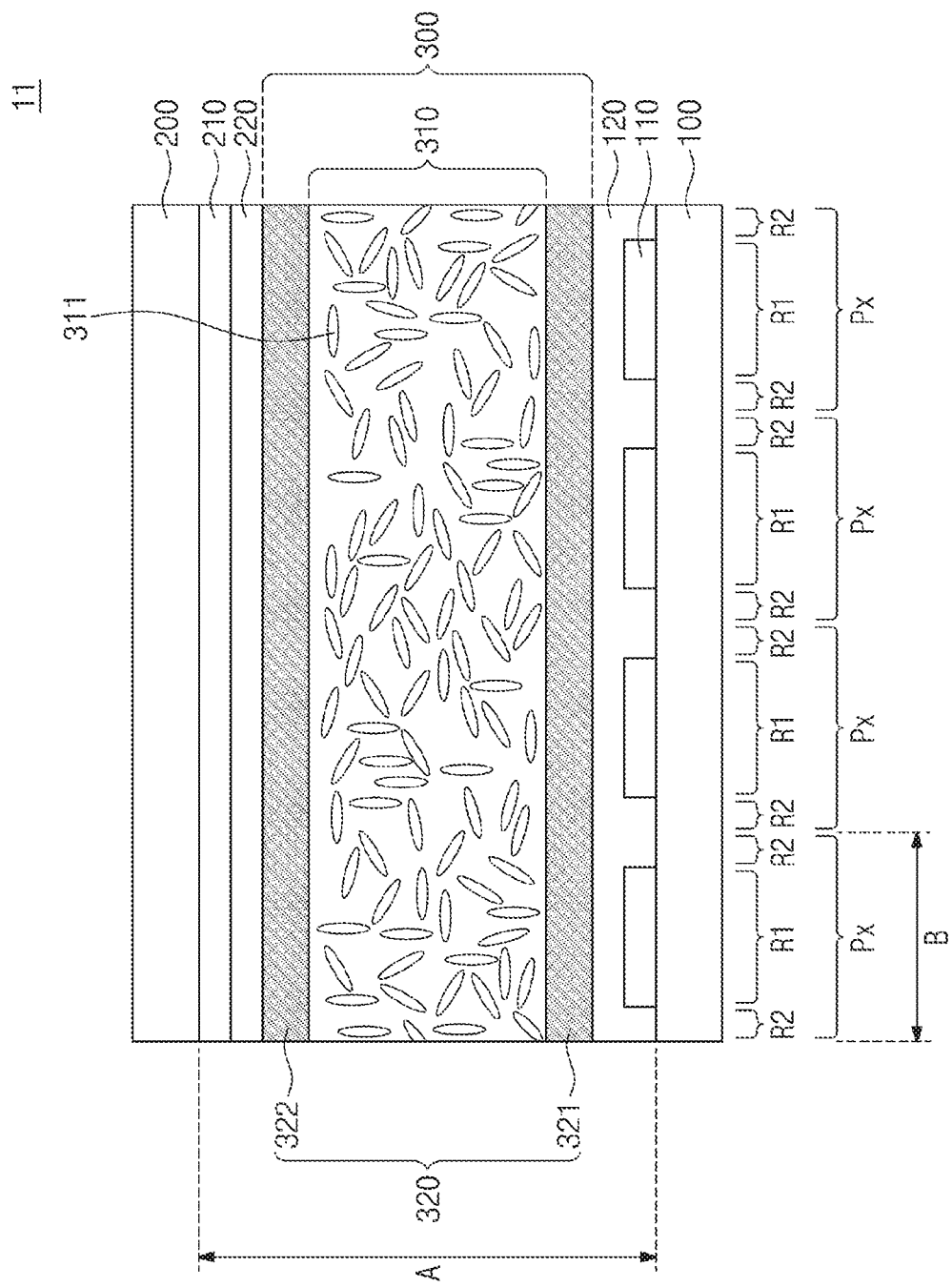
FIG. 1B is a cross-sectional view taken along the line I-II' of FIG. 1A.
Figure 2A:
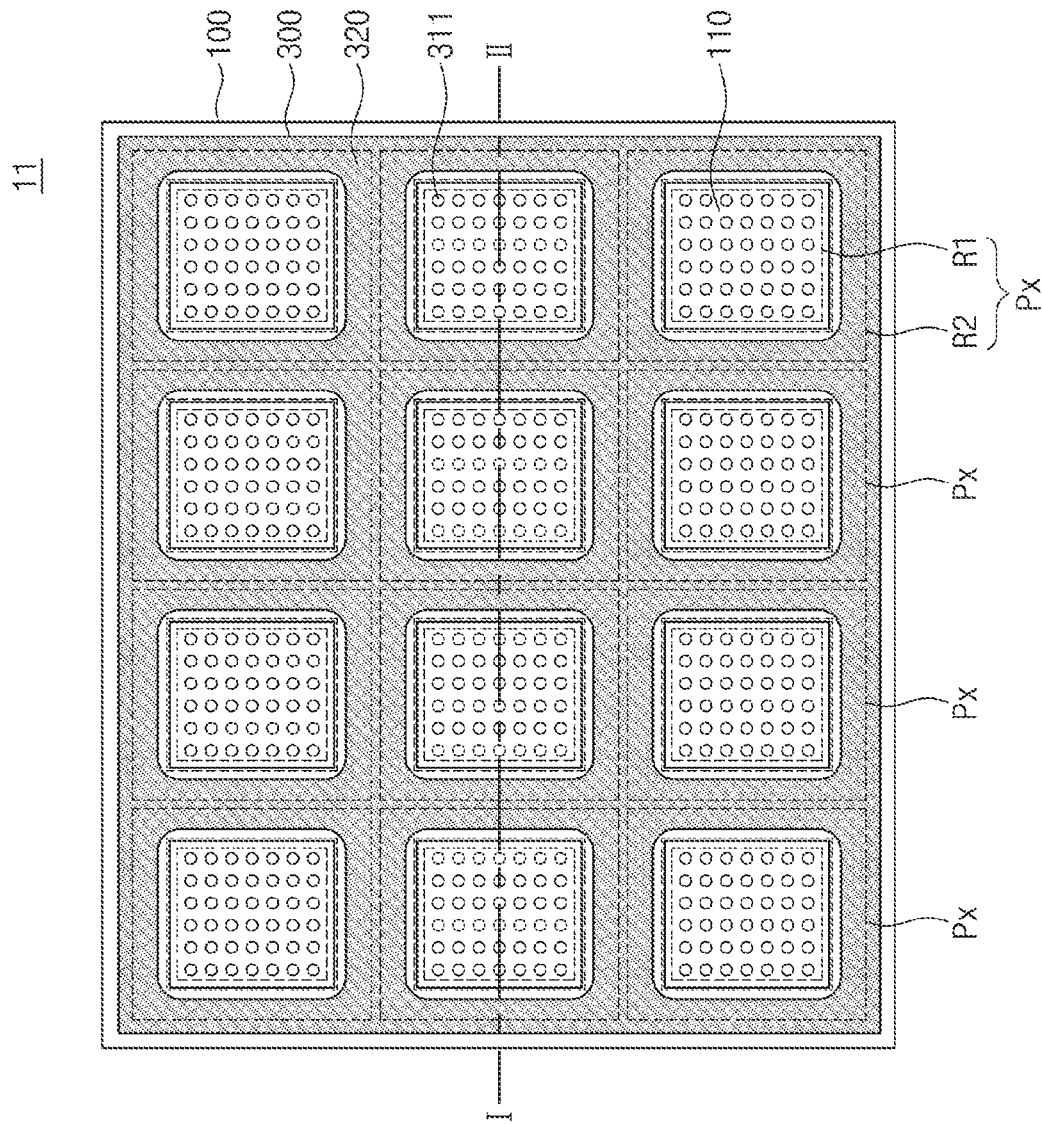
FIG. 2A is a plan view for explaining an operation method of the liquid crystal device of FIG. 1A.
Figure 2B:
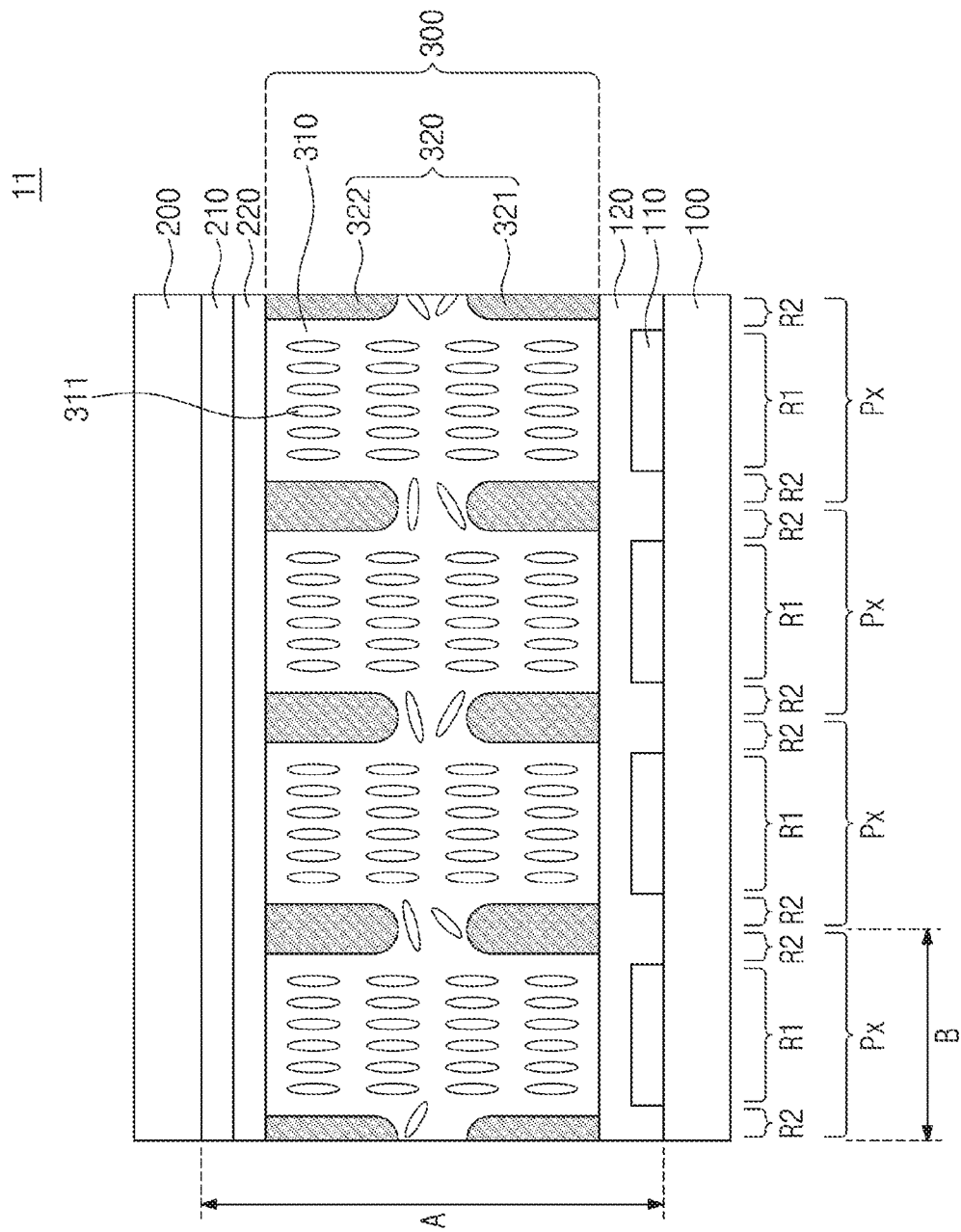
FIG. 2B is a cross-sectional view taken along the line I-II' of FIG. 2A.

FIG. 1A is a plan view of a liquid crystal device according to an embodiment of the inventive concept. FIG. 1B is a cross-sectional view taken along the line I-II' of FIG. 1A. FIG. 2A is a plan view for explaining an operation method of the liquid crystal device of FIG. 1A. FIG. 2B is a cross-sectional view taken along the line I-II' of FIG. 2A.

Referring to FIGS. 1A and 1B, a liquid crystal device 11 includes a first substrate 100, a first electrode 110, a liquid crystal layer 300, a second electrode 210, and a second substrate 200, which are stacked. The first substrate 100 may have a plurality of pixel regions Px in a plan view as in FIG. 1A. Each of the pixel regions Px may include a first region R1 and a second region R2. The second region R2 may surround the first region R1 in each pixel region Px. The first substrate 100 may be transparent. The first substrate 100 may include an organic matter or an inorganic matter. The first substrate 100 may include, for example, a plastic, a polymer, or a glass.

The first electrode 110 may be disposed on the first substrate 100. The first electrode 110 may have a rectangular shape as shown in FIG. 1A. As another example, the planar shape of the first electrode 110 may be variously modified into, for example, a circular shape, an elliptical shape, or a hexagonal shape. In a plan view, the first electrode 110 may overlap the first region R1 of the first substrate 100 and may cover the first region R1 of the first substrate 100. In a plan view, the first electrode 110 may not overlap the second region R2 of the first substrate 100. The first electrode 110 may expose the second region R2 of the first substrate 100 as shown in FIG. 1B. The first electrode 110 may be transparent. The first electrode 110 may include a transparent conductive oxide such as indium tin oxide (ITO) or indium zinc oxide (IZO).

A first alignment film 120 may be disposed on the first electrode 110. The first alignment film 120 may cover the first electrode 110 and the second region R2 of the first substrate 100 exposed by the first electrode 110. The first alignment film 120 may include a hydrophobic alignment material. The hydrophobic alignment material may include a fluorine-containing polymer. The hydrophobic alignment material included in the second alignment film 220 may be the same as or different from the hydrophobic alignment material included in the first alignment film 120.

The second alignment film 220 may be vertically spaced from the first alignment film 120. The second alignment film 220 may include a hydrophobic alignment material.

The second electrode 210 may be provided on the second alignment film 220. In a plan view, the second electrode 210 may overlap the first region R1 and the second region R2 of the first substrate 100. The second electrode 210 may function as a common electrode. The second electrode 210 may be transparent. The second electrode 210 may include a transparent conductive oxide such as indium tin oxide (ITO) or indium zinc oxide (IZO).

The second substrate 200 may be disposed on the second electrode 210. The second substrate 200 may include an organic matter or an inorganic matter.

The liquid crystal layer 300 may be disposed on the pixel regions Px of the first substrate 100. The liquid crystal layer 300 may be provided between the first electrode 110 and the second electrode 210. More specifically, the liquid crystal layer 300 may be provided between the first alignment film 120 and the second alignment film 220. The liquid crystal layer 300 may overlap the first region R1 and the second region R2 of each of the pixel regions Px of the first substrate 100 in a plan view. A separate partition may not be provided in the liquid crystal layer 300. Thus, the width B of the pixel regions Px may be reduced. The width B of the pixel regions Px may be equal to or less than the interval A between the first substrate 100 and the second substrate 210. The width B of the pixel regions Px may have a value substantially equal to the pitch of the pixel regions Px. Here, the first electrode 110 may include a plurality of first electrodes 110, and the pitch of the pixel regions Px may denote the pitch between two adjacent first electrodes 110. Hereinafter, for simplicity in description, a single first electrode 110 will be described.

The liquid crystal layer 300 may include a liquid crystal portion 310 and a hydrophobic portion 320 that are phase-separated from each other. The liquid crystal portion 310 and the hydrophobic portion 320 may overlap the first region R1 and the second region R2 of each pixel region Px in a plan view. The liquid crystal portion 310 may include liquid crystal molecules 311. The liquid crystal molecules 311 may have a positive dielectric constant or a negative dielectric constant. The hydrophobic portion 320 may include hydrophobic materials. Hydrophobicity in this specification means that the contact angle to water is greater than 90 degrees. The hydrophobic materials may include, for example, fluorine-containing polymers. The hydrophobic materials may include, for example, a polymer polymerized from at least one monomer selected from the group consisting of tetrafluoroethylene, trifluoroethylene, difluoroethylene, 2,2-bistrifluoromethyl-4,5-difluoro-1,3-dixole, and chlorotrifluoroethylene. The hydrophobic materials may exhibit more nonpolarity than the liquid crystal molecules 311. They may have a lower dielectric constant than the liquid crystal molecules 311. The hydrophobic materials may have a dielectric constant of $1/100$ to $1/2$ of the dielectric constant of the liquid crystal molecules 311. The hydrophobic materials may have, for example, a dielectric constant of 1 to 10. In this specification, the refractive index and the dielectric constant of the liquid crystal portion 310 may be substantially equal to the refractive index and the dielectric constant of the liquid crystal molecules 311, respectively. The refractive index of the hydrophobic portion 320 may be different from the refractive index of the liquid crystal portion 310. The refractive index of the hydrophobic portion 320 may be smaller than the refractive index of the liquid crystal portion 310. For example, the refractive index of the hydrophobic portion 320 may be 1.29 to 1.42, and the refractive index of the liquid crystal portion 310 may be 1.45 to 1.55. In this specification, the refractive index and dielectric constant of the hydrophobic portion 320 may be substantially the same as the refractive index and dielectric constant of hydrophobic materials, respectively. The hydrophobic portion 320 may be amorphous. The hydrophobic portion 320 may be transparent. The hydrophobic portion 320 may be in a liquid state.

The liquid crystal layer 300 may be in a state where there is no extra external force (for example, an electric field). The affinity between the first and second alignment films 120 and 220 and the hydrophobic portion 320 may be different from the affinity between the first and second alignment films 120 and 220 and the liquid crystal portion 310. Since the first alignment film 120 and the second alignment film 220 include hydrophobic alignment materials, the first alignment film 120 and the second alignment film 220 may more strongly interact with the hydrophobic portion 320 than the liquid crystal portion 310. For example, the affinity between the first and second alignment films 120 and 220 and the hydrophobic portion 320 may be greater than the affinity between the first and second alignment films 120 and 220 and the liquid crystal portion 310. The hydrophobic portion 320 may include a first sub-hydrophobic portion 321 and a second sub-hydrophobic portion 322 that are spaced apart from each other. The first sub-hydrophobic portion 321 may be in physical contact with the first alignment film 120 and the second sub-hydrophobic portion 322 may be in physical contact with the second alignment film 220. Although the upper surface of the first sub-hydrophobic portion 321 and the lower surface of the second sub-hydrophobic portion 322 are shown as being flat, unlike this, at least one of the upper surface of the first sub-hydrophobic portion 321 and the lower surface of the second sub-hydrophobic portion 322 may be curved.

The liquid crystal portion 310 may be spaced apart from the first alignment film 120 and the second alignment film 220. The liquid crystal portion 310 may be provided between the first sub-hydrophobic portion 321 and the second sub-hydrophobic portion 322.

Hereinafter, the operation of the liquid crystal device 11 will be described.

In FIGS. 1A and 1B, the liquid crystal device 11 may be in a state where no voltage difference is formed between the first electrode 110 and the second electrode 210. For example, no voltage may be applied to the first electrode 110 and the second electrode 210. As another example, the first voltage and the second voltage may be applied to the first electrode 110 and the second electrode 210, respectively, and the second voltage may be the same as the first voltage. The hydrophobic portion 320 may overlap the first regions R1 and the second regions R2 of the pixel regions Px of the liquid crystal layer 300. The liquid crystal molecules 311 of the liquid crystal portion 310 are not aligned and may be arranged in disorder.

Referring to FIGS. 2A and 2B, a voltage difference may occur between the first electrode 110 and the second electrode 210. For example, a third voltage may be applied to the first electrode 110, and a fourth voltage may be applied to the second electrode 210. The fourth voltage may be different from the third voltage. Due to the voltage difference, the liquid crystal molecules 311 may have a directivity and may be regularly aligned. As shown in FIG. 2B, the liquid crystal molecules 311 may be aligned in a direction perpendicular to the upper surface of the first substrate 100. The alignment direction of the liquid crystal molecules 311 is not limited to this and may be variously modified. At this point, the aligned liquid crystal molecules 311 may be disposed at positions where the electric field strongly acts, that is, between the first electrode 110 and the second electrode 210. The aligned liquid crystal molecules 311 may be disposed on a portion vertically overlapping the first electrode 110. The aligned liquid crystal molecules 311 may strongly interact with other adjacent liquid crystal molecules 311. Accordingly, adjacent liquid crystal molecules 311 may be gathered on a portion vertically overlapping the first electrode 110, and then aligned. Accordingly, the liquid crystal portion 310 may overlap the first regions R1 of the pixel regions Px of the first substrate 100 in a plan view. The hydrophobic portion 320 may have a low dielectric constant (for example, a dielectric constant of 1 to 10). The arrangement of hydrophobic materials may not be directly affected by the electric field. The hydrophobic portion 320 may move toward a portion (for example, the second region R2) that does not overlap the first electrode 110 by the liquid crystal molecules 311. A portion of the liquid crystal portion 310 may extend between the first sub-hydrophobic portion 321 and the second sub-hydrophobic portion 322. At this time, the liquid crystal molecules 311 between the first sub-hydrophobic portion 321 and the second sub-hydrophobic portion 322 may not be aligned.

The hydrophobic portion 320 may not overlap the first regions R1 of the pixel regions Px. The hydrophobic portion 320 may overlap the second regions R2 of the pixel regions Px. The hydrophobic portion 320 may function as partitions that partition the pixel regions Px. That is, the second regions R2 of the pixel regions Px may function as separate regions defining the respective pixel regions Px. The hydrophobic materials may prevent/reduce the occurrence of cross talk between the liquid crystal molecules 311 of different pixel regions Px. Accordingly, the resolution of the liquid crystal device 11 may be improved. If the dielectric constant of the hydrophobic materials is greater than ½ of the dielectric constant of the liquid crystal molecules 311, the hydrophobic portion 320 may be difficult to function as a partition. According to embodiments, the dielectric constant of the hydrophobic materials may be less than ½ of the dielectric constant of the liquid crystal molecules 311. Since the hydrophobic portion 320 partitions the liquid crystal molecules 311 of the first regions R1 of the pixel regions Px by the voltage difference, a separate partition may not be provided in the liquid crystal layer 300. Accordingly, the liquid crystal layer 300 may be miniaturized. The partition forming process may be omitted, so that the production of the liquid crystal device 11 may be further simplified. Although the pixel regions Px of the first substrate 100 have a fine pitch, the hydrophobic portion 320 may well partition the pixel regions Px. According to embodiments, the width B of the pixel regions Px may be equal to or less than the interval A between the first substrate 100 and the second substrate 200. The width B of the pixel regions Px of the liquid crystal device 11 is reduced so that the resolution of the liquid crystal device 11 may be further improved.

As another example, the content ratio of the hydrophobic substances in the liquid crystal layer 300 is adjusted, and in at least one of the second regions R2 of the first substrate 100, the corresponding first sub-hydrophobic portion 321 may be connected to the second sub-hydrophobic portion 322. The shape of the hydrophobic portion 320 is not limited to that shown in the drawings and may be variously modified.

FIG. 3 is a cross-sectional view of a liquid crystal device according to another embodiment, and corresponds to a section cut along the line I-II in FIG. 1A. Hereinafter, the contents overlapping with those described above will be omitted.

Referring to FIG. 3, a liquid crystal device 12 includes a first substrate 100, a first electrode 110, a first alignment film 120, a liquid crystal layer 300, a second alignment film 220, a second electrode 210, and a second substrate 200, which are stacked. The first substrate 100, the first electrode 110, the first alignment film 120, the liquid crystal layer 300, the second alignment film 220, the second electrode 210, and the second substrate 200 may be substantially the same as those described above with reference to FIGS. 1A and 1B.

The liquid crystal portion 310 of the liquid crystal layer 300 may further include a first dye 410 in addition to the liquid crystal molecules 311. The first dye 410 is soluble in the liquid crystal molecules 311 and may be dispersed in the liquid crystal portion 310. The first dye 410 may exhibit a first color. The hydrophobic portion 320 may further include a second dye 420 in addition to hydrophobic materials. The second dye 420 is soluble in hydrophobic materials and may be dispersed in the hydrophobic portion 320. The second dye 420 may exhibit a second color different from the first color. As another example, either the first dye 410 or the second dye 420 may be omitted.

In FIG. 3, a voltage difference may not be formed between the first electrode 110 and the second electrode 210. The liquid crystal device 12 may be operated by applying a voltage difference between the first electrode 110 and the second electrode 210. The operation method of the liquid crystal device 12 may be substantially the same as that described in the operation of the liquid crystal device 11 of FIGS. 1A to 2B.

Figure 4A:
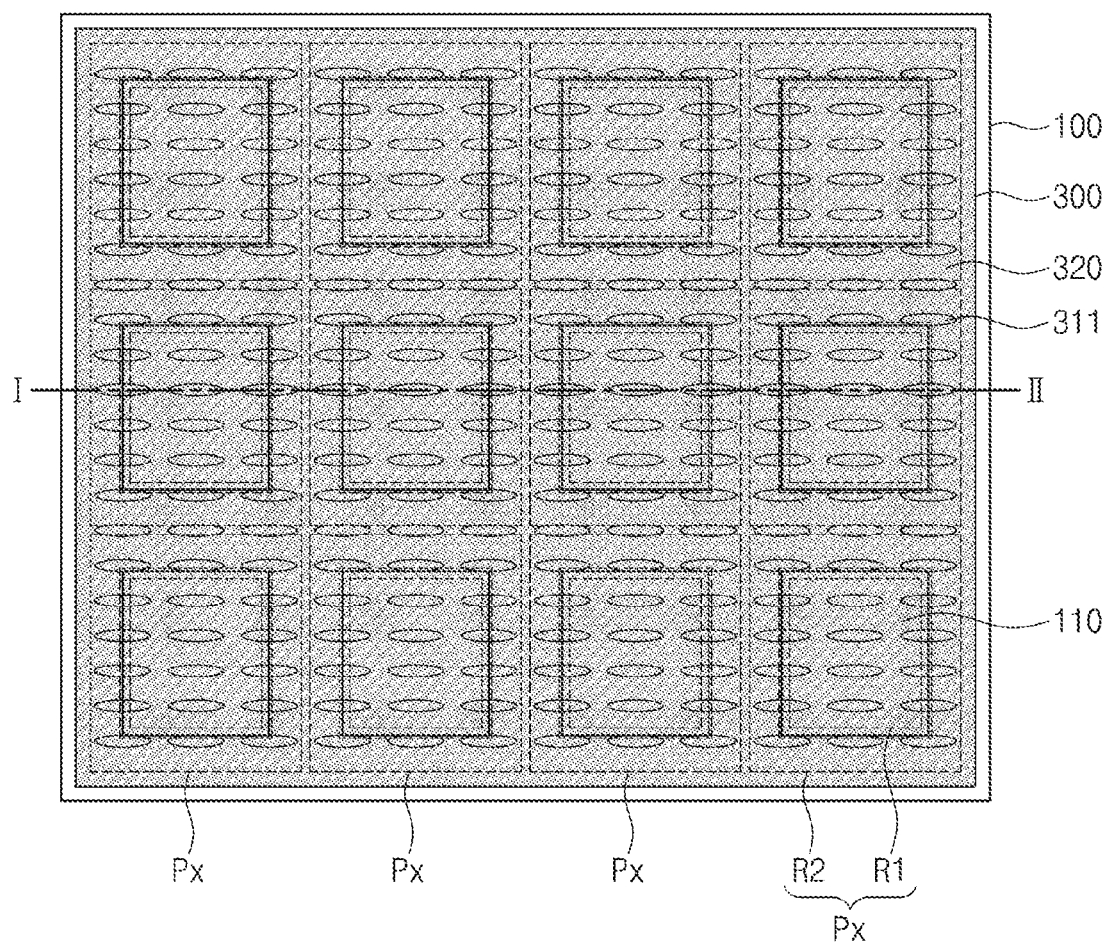
FIG. 4A is a plan view of a liquid crystal device according to an embodiment of the inventive concept.
Figure 4B:
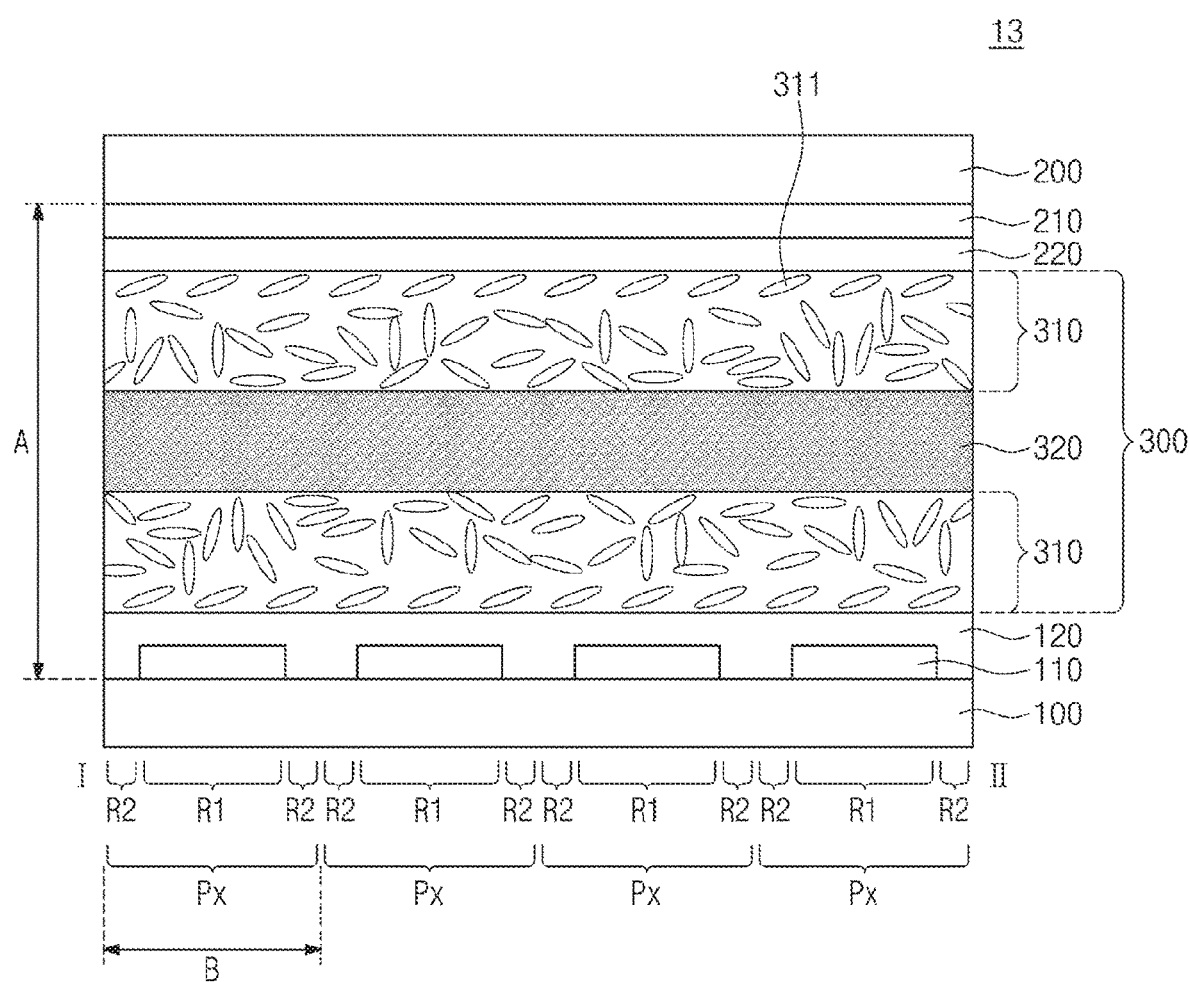
FIG. 4B is a cross-sectional view taken along the line I-II of FIG. 4A.
Figure 5A:
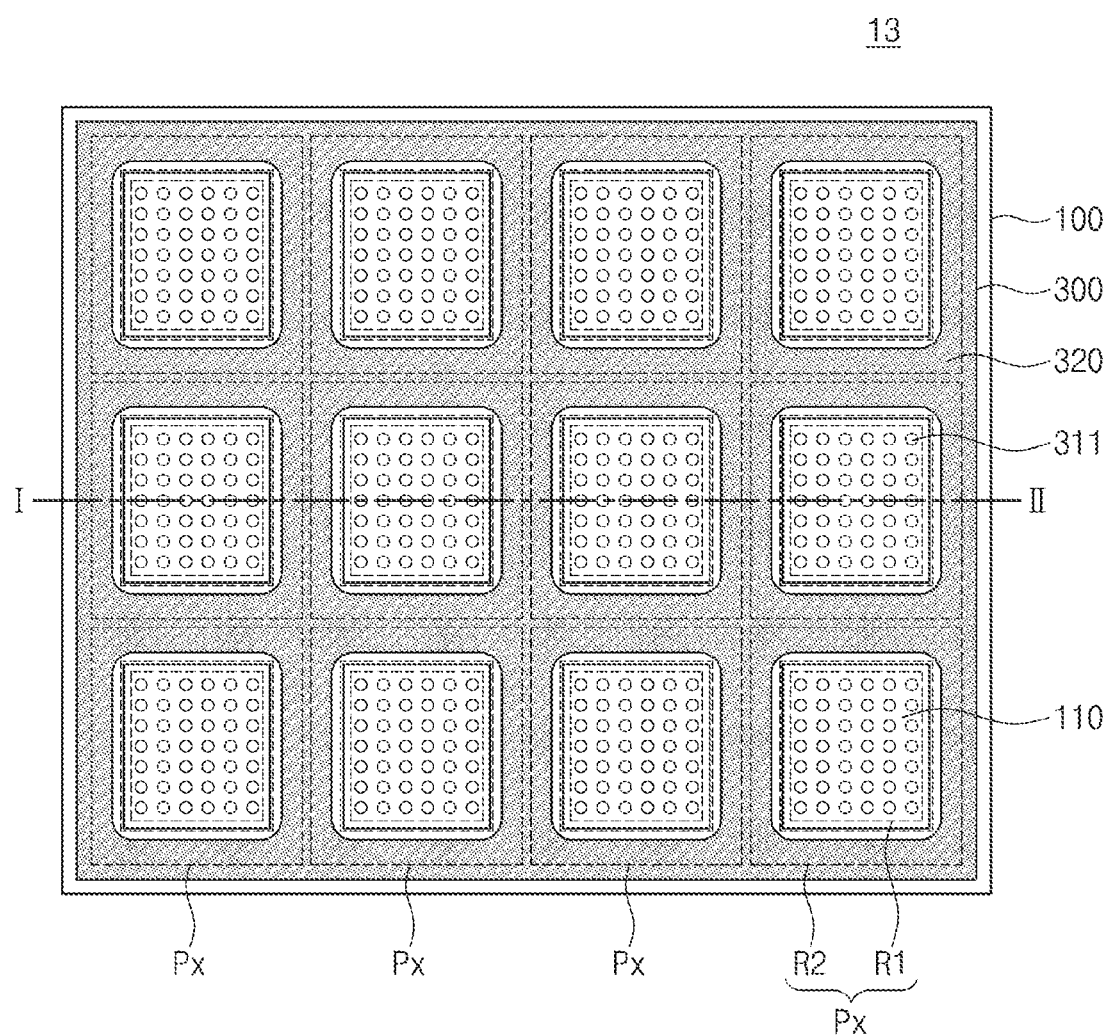
FIG. 5A is a plan view for explaining an operation method of the liquid crystal device of FIG. 4A.
Figure 5B:
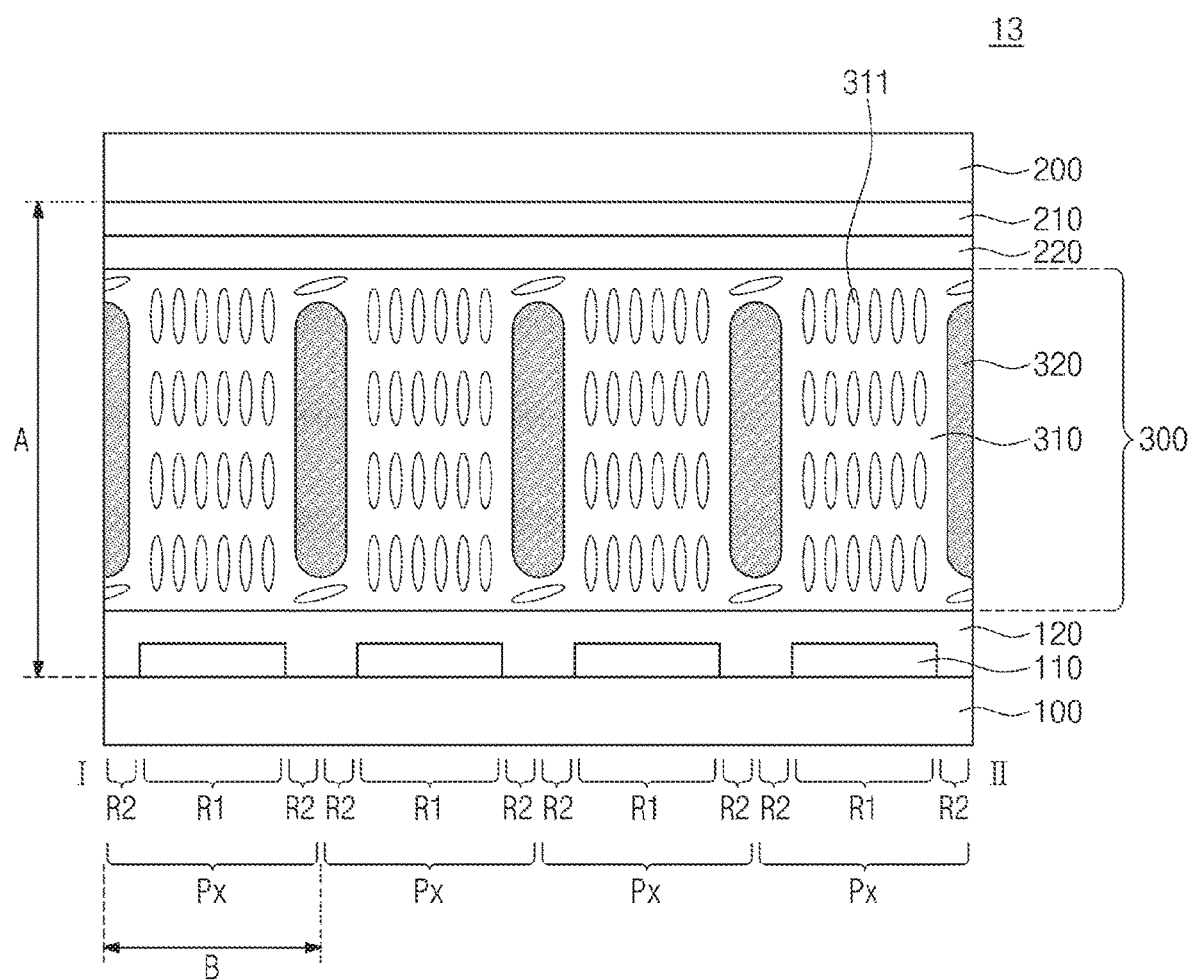
FIG. 5B is a cross-sectional view taken along the line I-II of FIG. 5A.

FIG. 4A is a plan view of a liquid crystal device according to an embodiment of the inventive concept. FIG. 4B is a cross-sectional view taken along the line I-II of FIG. 4A. FIG. 5A is a plan view for explaining an operation method of the liquid crystal device of FIG. 4A. FIG. 5B is a cross-sectional view taken along the line I-II of FIG. 5A.

Referring to FIGS. 4A and 4B, a liquid crystal device 13 includes a first substrate 100, a first electrode 110, a liquid crystal layer 300, a second electrode 210, and a second substrate 200, which are stacked. The first substrate 100 may have a plurality of pixel regions Px in a plan view as shown in FIG. 1A. Each of the pixel regions Px may include a first region R1 and a second region R2. In each of the pixel regions Px, the second region R2 may surround the first region R1. The first substrate 100 may be transparent. The first substrate 100 may include an organic matter or an inorganic matter. The first substrate 100 may include, for example, a plastic, a polymer, or a glass.

The first electrode 110 may be disposed on the first substrate 100. The first electrode 110 may have a rectangular shape as shown in FIG. 1A. As another example, the planar shape of the first electrode 110 may be variously modified into, for example, a circular shape, an elliptical shape, or a hexagonal shape. In a plan view, the first electrode 110 may overlap the first region R1 of the first substrate 100 and may cover the first region R1 of the first substrate 100. In a plan view, the first electrode 110 may not overlap the second region R2 of the first substrate 100. The first electrode 110 may expose the second region R2 of the first substrate 100 as shown in FIG. 1B. The first electrode 110 may be transparent. The first electrode 110 may include a transparent conductive oxide such as indium tin oxide (ITO) or indium zinc oxide (IZO).

A first alignment film 120 may be disposed on the first electrode 110. The first alignment film 120 may cover the first electrode 110 and the second region R2 of the first substrate 100 exposed by the first electrode 110. The first alignment film 120 and the second alignment film 220 may include an organic alignment material or an inorganic alignment material. The organic alignment material may include a polymer such as polyimide or polyvinyl alcohol. The inorganic alignment material may include silicon oxide (SiO), silicon nitride (SiN), silicon oxynitride (SION), or aluminum oxide (AlO). The second alignment film 220 may include the same or different material as the first alignment film 120.

The second alignment film 220 may be vertically spaced from the first alignment film 120. The second alignment film 220 may include a hydrophobic alignment material.

The second electrode 210 may be provided on the second alignment film 220. In a plan view, the second electrode 210 may overlap the first region R1 and the second region R2 of the first substrate 100. The second electrode 210 may function as a common electrode. The second electrode 210 may be transparent. The second electrode 210 may include a transparent conductive oxide such as indium tin oxide (ITO) or indium zinc oxide (IZO).

The second substrate 200 may be disposed on the second electrode 210. The second substrate 200 may include an organic matter or an inorganic matter.

The liquid crystal layer 300 may be disposed on the pixel regions Px of the first substrate 100. The liquid crystal layer 300 may be provided between the first electrode 110 and the second electrode 210. The liquid crystal layer 300 may overlap the first region R1 and the second region R2 of each of the pixel regions Px of the first substrate 100 in a plan view. A separate partition may not be provided in the liquid crystal layer 300. Thus, the width B of the pixel regions Px may be reduced. The width B of the pixel regions Px may be equal to or less than the interval A between the first substrate 100 and the second substrate 210. The width B of the pixel regions Px may have a value substantially equal to the pitch of the pixel regions Px. Here, the first electrode 110 may include a plurality of first electrodes 110, and the pitch of the pixel regions Px may denote the pitch between two adjacent first electrodes 110. Hereinafter, for simplicity in description, a single first electrode 110 will be described.

The liquid crystal layer 300 may include a liquid crystal portion 310 and a hydrophobic portion 320 that are phase-separated from each other. The liquid crystal portion 310 and the hydrophobic portion 320 may overlap the first region R1 and the second region R2 of each pixel region Px in a plan view. The liquid crystal portion 310 may include liquid crystal molecules 311. The liquid crystal molecules 311 may have a positive dielectric constant or a negative dielectric constant. The liquid crystal molecules 311 may be nematic liquid crystal molecules. The nematic liquid crystal molecules may be at least one selected from among biphenyl-based, phenyl cyclohexyl-based, terphenyl-based, tran-based, pyrimidine-based, and stilbene-based liquid crystal molecules. The phase transition temperature ($T_{NI}$) of the liquid crystal molecules may be high, and preferably be 60-150° C. in consideration of a usage range. In addition, the nematic liquid crystal molecules may have a refractive index anisotropy of 0.1-0.3, and a dielectric anisotropy of 5-40 when an electric field is applied.

The hydrophobic portion 320 may include hydrophobic materials. Hydrophobicity in this specification means that the contact angle to water is greater than 100 degrees. The hydrophobic materials may have a molecular weight of 300 to 5,000. The hydrophobic materials may include, for example, fluorine-containing polymers or fluorine-containing liquid. The hydrophobic materials may include, for example, a polymer polymerized from at least one monomer selected from among tetrafluoroethylene, trifluoroethylene, difluoroethylene, 2,2-bisfluoromethyl-4,5-difluoro-1,3-dixole, and chlorotrifluoroethylene. The hydrophobic materials may exhibit more nonpolarity than the liquid crystal molecules 311. They may have a lower dielectric constant than the liquid crystal molecules 311. The hydrophobic materials may have a dielectric constant of $\frac{1}{100}$ to $\frac{1}{2}$ of the dielectric constant of the liquid crystal molecules 311. The hydrophobic materials may have, for example, a dielectric constant of 1 to 10. In this specification, the refractive index and the dielectric constant of the liquid crystal portion 310 may be substantially equal to the refractive index and the dielectric constant of the liquid crystal molecules 311, respectively. The refractive index of the hydrophobic portion 320 may be different from the refractive index of the liquid crystal portion 310. The refractive index of the hydrophobic portion 320 may be smaller than the refractive index of the liquid crystal portion 310. For example, the refractive index of the hydrophobic portion 320 may be 1.25 to 1.45, and the refractive index of the liquid crystal portion 310 may be 1.45 to 1.55. In this specification, the refractive index and dielectric constant of the hydrophobic portion 320 may be substantially the same as the refractive index and dielectric constant of hydrophobic materials, respectively. The hydrophobic portion 320 may be amorphous. The hydrophobic portion 320 may be transparent. The hydrophobic portion 320 may be in a liquid state.

When a voltage is not applied to the first electrode 110 and the second electrode 210, the liquid crystal layer 300 may be in a state where there is no extra external force (for example, an electric field. The affinity between the first and second alignment films 120 and 220 and the hydrophobic portion 320 may be greater than the affinity between the first and second alignment films 120 and 220 and the liquid crystal portion 310. The hydrophobic portion 320 may be spaced apart from the first alignment film 120 and the second alignment film 220. The liquid crystal portion 310 may include a plurality of liquid crystal portions 310. The liquid crystal portions 310 may be provided between the hydrophobic portion 320 and the first alignment film 120 or between the hydrophobic portion 320 and the second alignment film 220. The liquid crystal portions 310 may be in physical contact with the first alignment film 120 or the second alignment film 220. Even if a separate external force (for example, an electric field) is not applied to the liquid crystal layer 300, as in FIGS. 4A and 4B, the liquid crystal molecules 311 adjacent to the first alignment film 120 may be aligned by the first alignment film 120. The liquid crystal molecules 311 adjacent to the second alignment film 220 may be aligned by the second alignment film 220. The liquid crystal molecules 311, which are spaced more than a predetermined distance apart from the first and second alignment films 120 and 220, may not be aligned and may be disorderly arranged. Hereinafter, a single number of liquid crystal portions 310 will be described.

Hereinafter, an operation method of the liquid crystal device 13 will be described.

In FIGS. 4A and 4B, the liquid crystal device 13 may be in a state where no voltage difference is formed between the first electrode 110 and the second electrode 210. The arrangement of the liquid crystal portion 310 and the hydrophobic portion 320 may be the same as described above. The hydrophobic portion 320 may overlap the first regions R1 and the second regions R2 of the pixel regions Px of the liquid crystal layer 300. When the liquid crystal molecules 311 are separated from the first and second alignment films 120 and 220 by a predetermined distance or more, the liquid crystal molecules 311 may be randomly arranged.

Referring to FIGS. 5A and 5B, a voltage difference may occur between the first electrode 110 and the second electrode 210 of the liquid crystal device 13. For example, a third voltage and a fourth voltage may be applied to the first electrode 110 and the second electrode 210, respectively. The fourth voltage may be different from the third voltage. Due to the voltage difference, the liquid crystal molecules 311 may have a directivity and may be regularly aligned. The aligned liquid crystal molecules 311 may be disposed on a portion vertically overlapping the first electrode 110, and the liquid crystal portion 310 may overlap the first regions R1 of the pixel regions Px in a plan view. The hydrophobic portion 320 may move toward the second regions R2 of the pixel regions Px by the liquid crystal molecules 311. The hydrophobic portion 320 may overlap the second regions R2 of the first substrate 100. The hydrophobic portion 320 may be spaced apart from the first regions R1 of the pixel regions Px in a plan view. The generation of crosstalk between the liquid crystal molecules 311 of the respective pixel regions Px may be prevented/reduced by the hydrophobic portion 320. Accordingly, the resolution of the liquid crystal device 13 may be improved.

Since hydrophobic materials have low affinity for the first alignment film 120 and the second alignment film 220, as shown in FIG. 2B, a portion of the liquid crystal portion 310 may extend between the first alignment film 120 and the hydrophobic portion 320' and between the hydrophobic portion 320' and the second alignment film 220. The alignment direction of the liquid crystal molecules 311 on the second regions R2 of the pixel regions Px may be determined by the first and second alignment films 120 and 220. The liquid crystal molecules 311 on the second regions R2 of the pixel regions Px may be aligned in a different direction from the liquid crystal molecules 311 on the first regions R1. The shape of the hydrophobic portion 320' is not limited to that shown in the drawings and may be variously modified.

During the operation of the liquid crystal device 13, the hydrophobic portion 320 of the liquid crystal layer 300 may function as partitions which partition the pixel regions Px. The hydrophobic portion 320 have a dielectric constant (for example, $\frac{1}{10}$ of the dielectric constant of the liquid crystal molecules) lower than the dielectric constant of the liquid crystal molecules, and are thus not affected by the electric field during the operation of the liquid crystal device 13. The hydrophobic portion 320 may function as a partition and thus achieve good vertical alignment of the liquid crystal molecules 311. Therefore, the interference between the liquid crystal molecules 311 in different pixel regions Px may be reduced/prevented. Furthermore, even if the pixel regions Px have fine pitches, the hydrophobic portion 320 may prevent/reduce the occurrence of crosstalk between the pixel regions Px. Accordingly, the resolution of the liquid crystal device may be improved.

Since the hydrophobic portion 320 partitions the liquid crystal portions 310, a separate partition may not be provided in the liquid crystal layer. Accordingly, the liquid crystal layer 300 may be miniaturized. The partition forming process may be omitted, so that the production of the liquid crystal device may be further simplified.

FIG. 6 is a cross-sectional view illustrating a liquid crystal device according to another embodiment of the inventive concept. Hereinafter, the contents overlapping with those described above will be omitted.

Referring to FIG. 6, a liquid crystal device 14 includes a first substrate 100, a first electrode 110, a first alignment film 120, a liquid crystal layer 300, a second alignment film 220, a second electrode 210, and a second substrate 200, which are stacked. The first substrate 100, the first electrode 110, the second electrode 210, and the second substrate 200 may be substantially the same as those described above with reference to FIGS. 1A and 1B. The first alignment film 120, the liquid crystal layer 300, and the second alignment film 220 may be substantially the same as those described above with reference to FIGS. 4A and 4B.

The liquid crystal portion 310 of the liquid crystal layer 300 may further include a first dye 410 in addition to the liquid crystal molecules 311. The first dye 410 may exhibit a first color. The hydrophobic portion 320' may further include a second dye 420 in addition to hydrophobic materials. The second dye 420 may exhibit a second color different from the first color. As another example, either the first dye 410 or the second dye 420 may be omitted.

The liquid crystal device 14 of FIG. 6 may be in a state where a voltage difference is not provided between the first electrode 110 and the second electrode 210. The liquid crystal device 14 may be operated by applying a voltage difference between the first electrode 110 and the second electrode 210. The operation method of the liquid crystal device 14 may be substantially the same as that described in the operation of the liquid crystal device 13 of FIGS. 4A to 5B.

Figure 7:
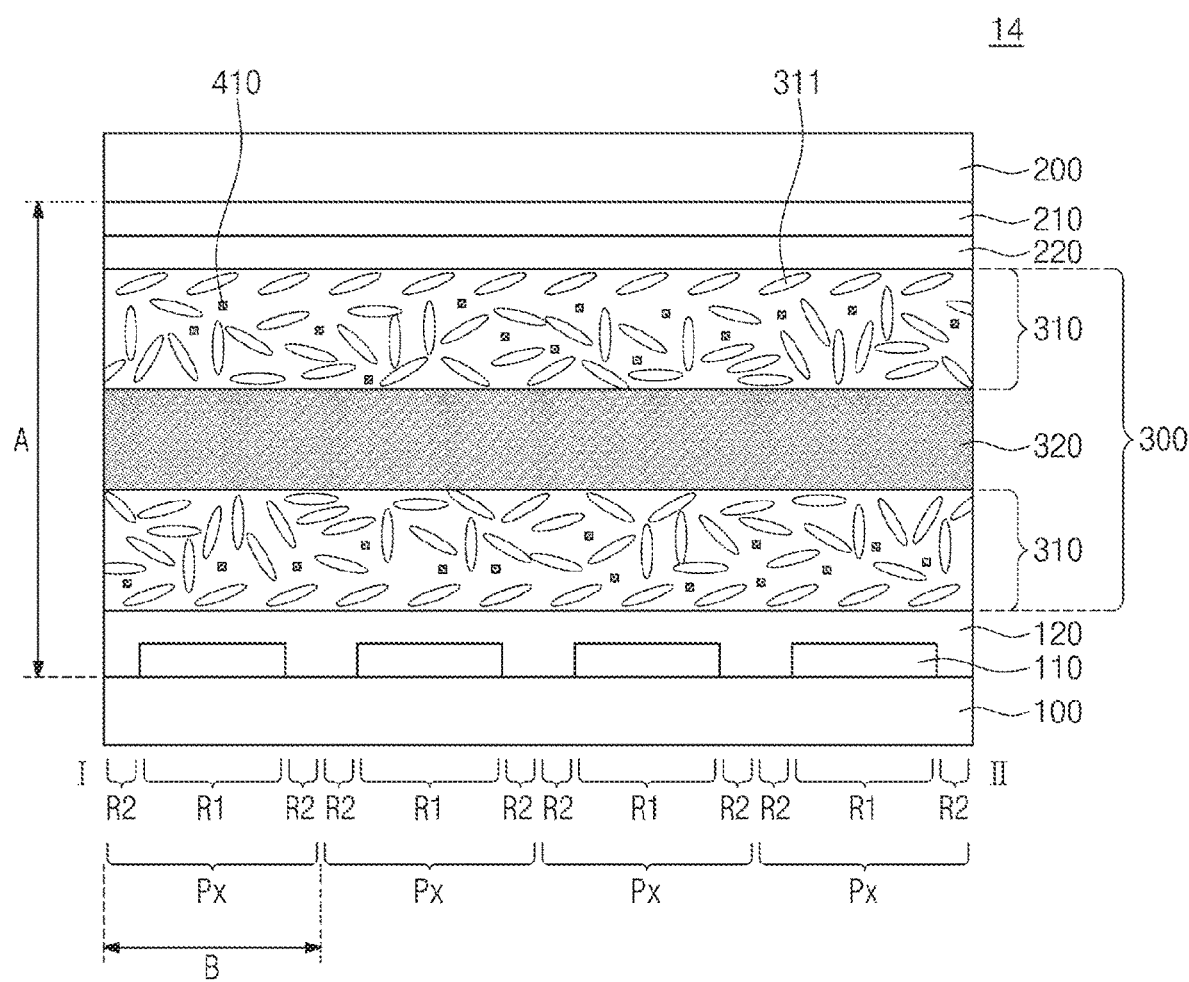
FIGS. 7 and 8 are cross-sectional views of a liquid crystal device according to embodiments of the inventive concept.
Figure 8:
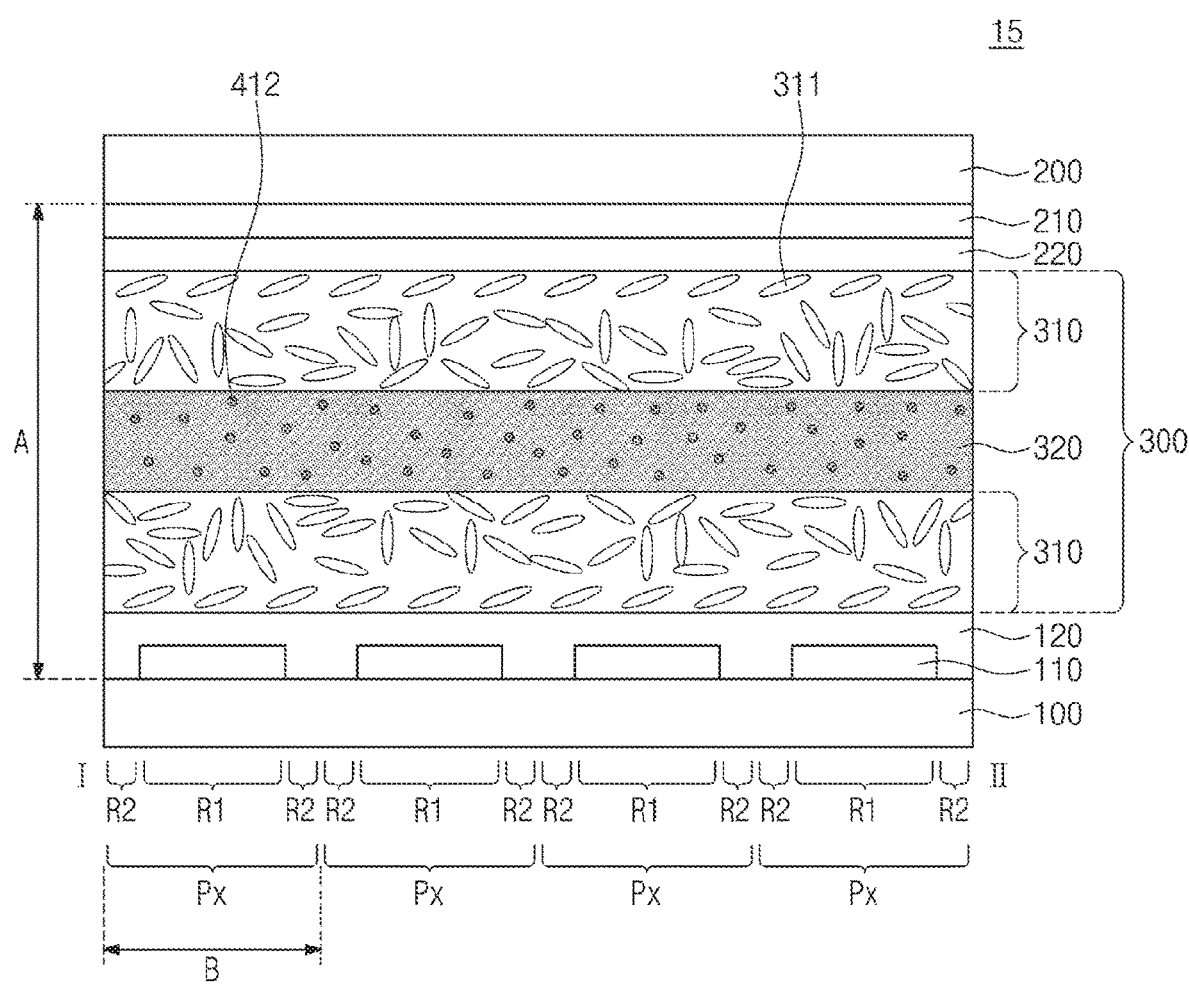

FIGS. 7 and 8 are cross-sectional views of a liquid crystal device according to embodiments of the inventive concept.

Referring to FIGS. 7 and 8, liquid crystal devices 14 and 15 each may include a first substrate 100, a first electrode 110, a first alignment layer 120, a liquid crystal layer 300, a second alignment layer 220, a second electrode 210, and a second substrate 200, which are stacked. The first substrate 100, the first electrode 110, the second electrode 210 and the second substrate 200 may be substantially same as those as previously described with reference to FIGS. 1A and 1B. The first alignment layer 120, the liquid crystal layer 300, and the second alignment layer 220 be substantially same as those as previously described with reference to FIGS. 1A and 1B.

The liquid crystal portion 310 of the liquid crystal layer 300 may further include a first coloring material 410 as shown in FIG. 3, in addition to the liquid crystal molecules 311. Alternatively, the hydrophobic portion 320 of the liquid crystal layer 300 may further include a second coloring material 412 as shown in FIG. 4. The first coloring material 410 or the second coloring material 420 is a coloring material having a selective solubility only with respect to liquid crystal molecules or a hydrophobic material, and may be a dye or a pigment, and preferably a dye. When the first coloring material 410 included in the liquid crystal portion 310 is a dye, the first coloring material 410 has an aromatic ring or a condensed ring. This may increase an intermolecular interaction between the first coloring material 410 and the liquid crystal molecules 311 having an aromatic molecular structure to thereby improve the solubility of the dye in the liquid crystal molecules. In addition, the intermolecular interaction between the liquid crystal molecules and the first coloring material 410 is increased to increase the dispersion stability of the first coloring material 410 in the liquid crystal molecules. The first coloring material 410 or the second coloring material 412 may have one color among yellow, cyan, and magenta or one color among red, blue and green.

When the first coloring material 410 is a yellow dye, the first coloring material 410 may have a structure in which two aromatic rings are linked to each other via an azo group. Specifically, when the first coloring material 410 is a yellow dye, the first coloring material 410 may have a structure of Chemical Formula 1 below.

<Chemical Formula 1>

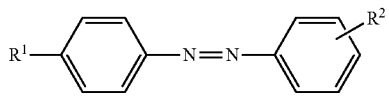

In Chemical Formula 1, $R^1$ is a dialkylamino group {—$N(C_nH_{2n+1})$ where n is an integer of 1 or more}, $R^2$ is hydrogen, a methyl group, an ethyl group, a linear or branched alkyl group having three or more carbon atoms, an alkenyl group having three or more carbon atoms, or an aromatic group.

For example, the first coloring material 410 may be azobenzene.

Alternatively, the first coloring material 410 may be a magenta dye, and may have a structure of Chemical Formula 2 below.

<Chemical Formula 2>

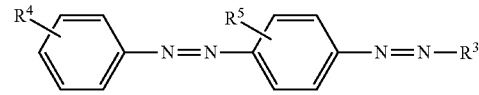

In Chemical Formula 2, $R^3$ may be one selected from Chemical Formula 3 below.

<Chemical Formula 3>

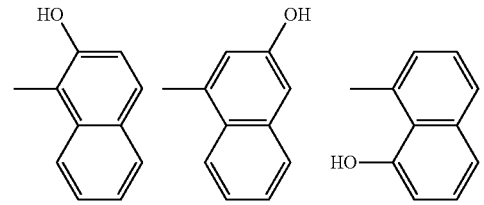

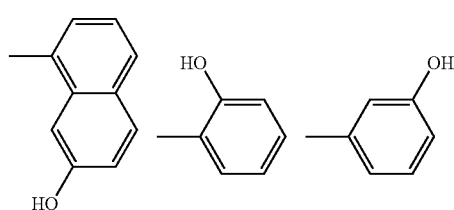

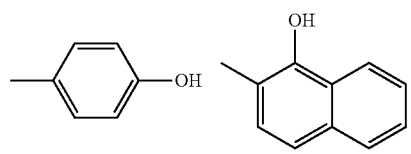

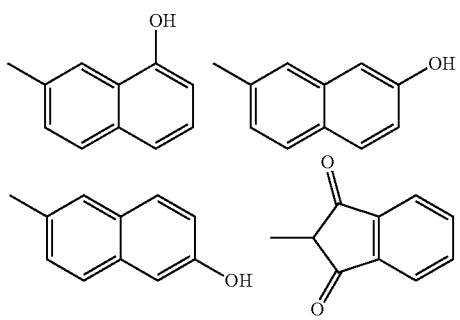

In Chemical Formula 3, $R^4$ and $R^5$ are each independently hydrogen, a methyl group, an ethyl group, a linear or branched alkyl group having three or more carbon atoms, an alkenyl group having three or more carbon atoms, or an aromatic group.

For example, the first coloring material 410 may be Sudan III.

Alternatively, the first coloring material 410 may be a cyan dye, and may have a structure of Chemical Formula 4 below.

<Chemical Formula 4>

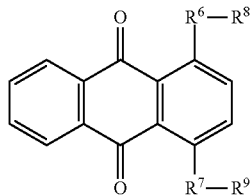

In Chemical Formula 4, $R^6$ and $R^7$ are each independently one among oxygen (O), sulfur (S), selenium (Se), a methylene group, —NH—, and an ester group, $R^8$ and $R^9$ are each independently hydrogen, a methyl group ($CH_3$), an ethyl group ($C_2H_5$), a propyl group ($C_3H_7$), a butyl group ($C_4H_9$), a pentyl group ($C_5H_{11}$), a linear or branched alkyl group having six or more carbon atoms, a linear or branched alkenyl group having three or more carbon atoms, or an aromatic group. The first coloring material 410 may be included in an amount of 0.001-5 wt % with respect to the total weight of the liquid crystal molecules 311.

A mass ratio of the liquid crystal portion 310 to the hydrophobic portion 320 in the liquid crystal layer 300 may be 95:5 to 30:70, or 90:10 to 50:50.

The liquid crystal devices 14 and 15 in FIGS. 7 and 8 may be in a state in which a voltage difference is not provided between the first electrode 110 and the second electrode 210. Upon applying a voltage difference between the first electrode 110 and the second electrode 210, the hydrophobic portion 320 moves toward the second regions R2 and may serve as a partition. This may change the color concentration of the liquid crystal portion 310 or hydrophobic portion 320.

Figure 9:
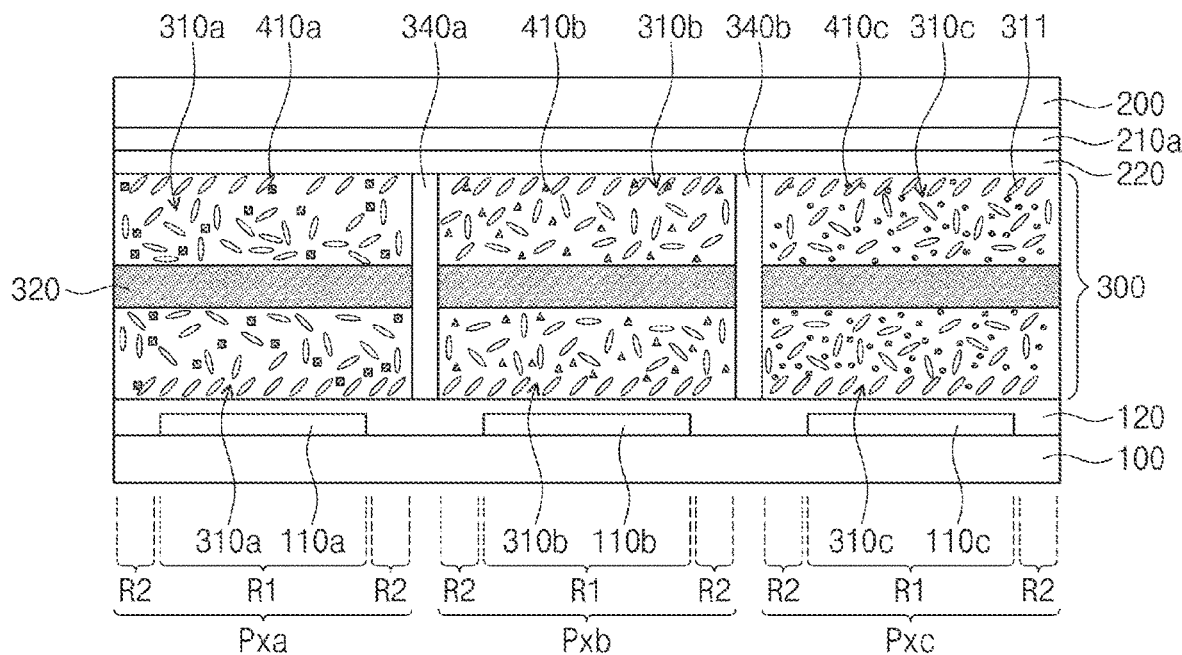
FIG. 9 is a cross-sectional view of a liquid crystal device according to embodiments of the inventive concept.

FIG. 9 is a cross-sectional view of a liquid crystal device according to embodiments of the inventive concept.

Referring to FIG. 9, the first substrate 100 of this liquid crystal device 16 may have a plurality of pixel regions Pxa, Pxb, Pxc in a plan view, as similar to that in FIG. 4A. The pixel regions Pxa, Pxb, Pxc may include a first pixel region Pxa, a second pixel region Pxb and a third pixel region Pxc. The pixel regions Pxa, Pxb, Pxc each may include a first region R1 and a second region R2. In each of the pixel regions Pxa, Pxb, Pxc, the second region R2 may surround the first region R1. A first pixel electrode 110a may be disposed on the first substrate 100 in the first pixel region Pxa. A second pixel electrode 110b may be disposed on the first substrate 100 in the second pixel region Pxb. A third pixel electrode 110c may be disposed on the first substrate 100 in the third pixel region Pxc.

A first alignment film 120 may be disposed on the first to third pixel electrodes 110a, 110b and 110c. The first alignment film 120 may cover the second region R2 of the first substrate exposed between the first to third pixel electrodes 110a, 110b and 110c. A second alignment film 220 may be vertically spaced from the first alignment film 120. A common electrode 210a may be provided on the second alignment film 220. The common electrode 210a may overlap the first region R1 and the second region R2 of the first substrate 100 in a plan view. The common electrode 210a may be transparent. The common electrode 210a may include a transparent conductive oxide such as indium tin oxide (ITO) or indium zinc oxide (IZO).

The second substrate 200 may be disposed on the common electrode 210a. The second substrate 200 may include an organic matter or an inorganic matter. The common electrode 210a may overlap the first to third pixel electrodes 110a, 110b and 110c. A liquid crystal layer 300 may be interposed between the first alignment film 120 and the second alignment film 220. A first partition 340a may penetrate the liquid crystal layer 300 between the first pixel region Pxa and the second pixel region Pxb to divide the liquid crystal portion of the liquid crystal layer 300 into a first pixel liquid crystal portion 310a and a second pixel liquid crystal portion 310b. A second partition 340b may penetrate the liquid crystal layer 300 between the second pixel region Pxb and the third pixel region Pxc to divide the liquid crystal portion of the liquid crystal layer 300 into the second pixel liquid crystal portion 310b and a third pixel liquid crystal portion 310c. The liquid crystal layer 300 includes hydrophobic portions which are phase-separated from the pixel liquid crystal portions 310a, 310b and 310c. The hydrophobic portions 320 may also be spaced apart from each other by the first partition 340a and the second partition 340b. The first partition 340a and the second partition 340b may be formed of a polymer material.

When a voltage is not applied to the common electrode 210a and the first to third pixel electrodes 110a, 110b and 110c, a portion of the first pixel liquid crystal portion 310a is in contact with the first alignment film 120, and the rest of the first pixel liquid crystal portion 310a is in contact with the second alignment film 220, wherein the hydrophobic portion may be disposed therebetween. Likewise, the hydrophobic portion 320 may divide each of the second pixel liquid crystal portion 310b and the third pixel liquid crystal portion 310c into two sections.

The first pixel liquid crystal portion 310a may further include a first dye 410a in addition to liquid crystal molecules 311. The second pixel liquid crystal portion 310b may further include a second dye 410b in addition to the liquid crystal molecules 311. The third pixel liquid crystal portion 310c may further include a third dye 410c in addition to the liquid crystal molecules 311. The first to third dyes 410a, 410b and 410c may be different from each other. One of the first to third dyes 410a, 410b and 410c may be a yellow dye having a structure of Chemical Formula 1. Another one of the first to third dyes 410a, 410b and 410c may be a magenta dye having a structure of Chemical Formula 2. The remaining one of the first to third dyes 410a, 410b and 410c may be a cyan dye having a structure of Chemical Formula 4. Other configurations may be same as or similar to those that have been described with reference to FIGS. 1A and 2B, and thus further description will be omitted herein.

Figure 10:
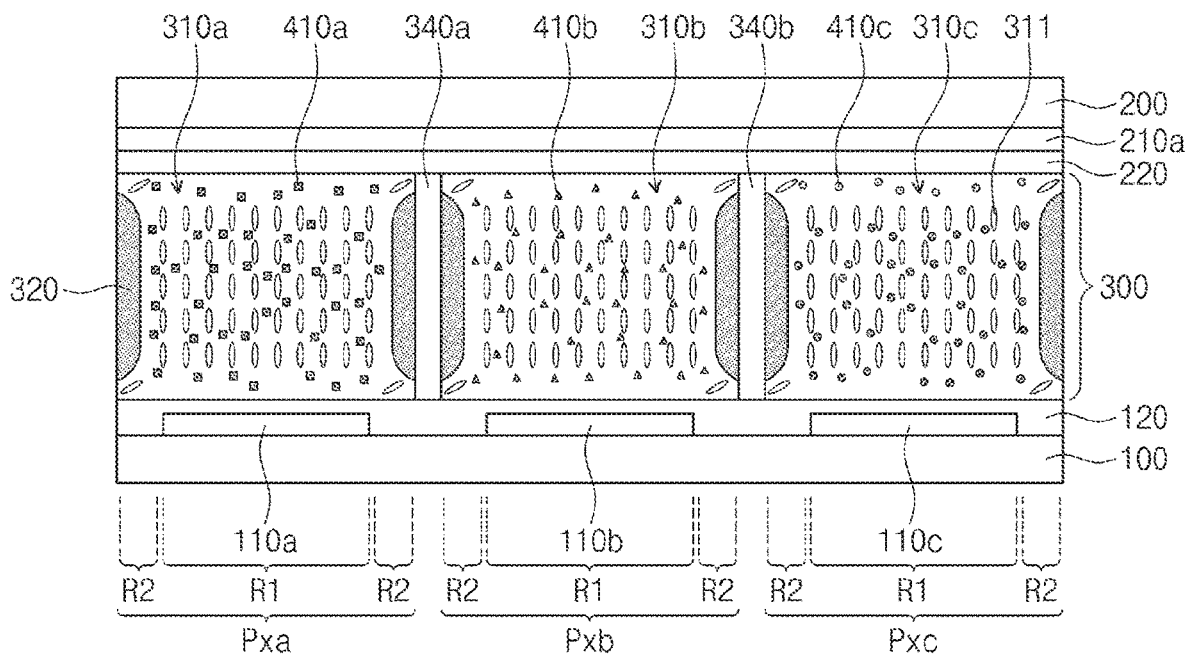
FIG. 10 illustrates an operation method of the liquid crystal display of FIG. 9.

FIG. 10 illustrates an operation method of the liquid crystal display of FIG. 9.

Referring to FIG. 10, when a voltage is applied to the common electrode 210a and the first to third pixel electrodes 110a, 110b and 110c, the liquid crystal molecules 311 are vertically aligned between the first to third pixel electrodes 110a, 110b and 110c, and the hydrophobic portion 320 moves toward the partitions 340a and 340b. The volumes of the pixel liquid crystal portions 310a, 310b and 310c occupying in the liquid crystal layer 300 may be reduced to decrease a driving voltage. When the hydrophobic portion 320 moves toward the second regions R2, the color concentrations of the first to third pixel liquid crystal portions 310a, 310b and 310c may thus be changed. In the liquid crystal device according to this embodiment, the first to third pixel liquid crystal portions 310a, 310b and 310c respectively include coloring materials having different colors, and thus a color filter array may be omitted.

Figure 11:
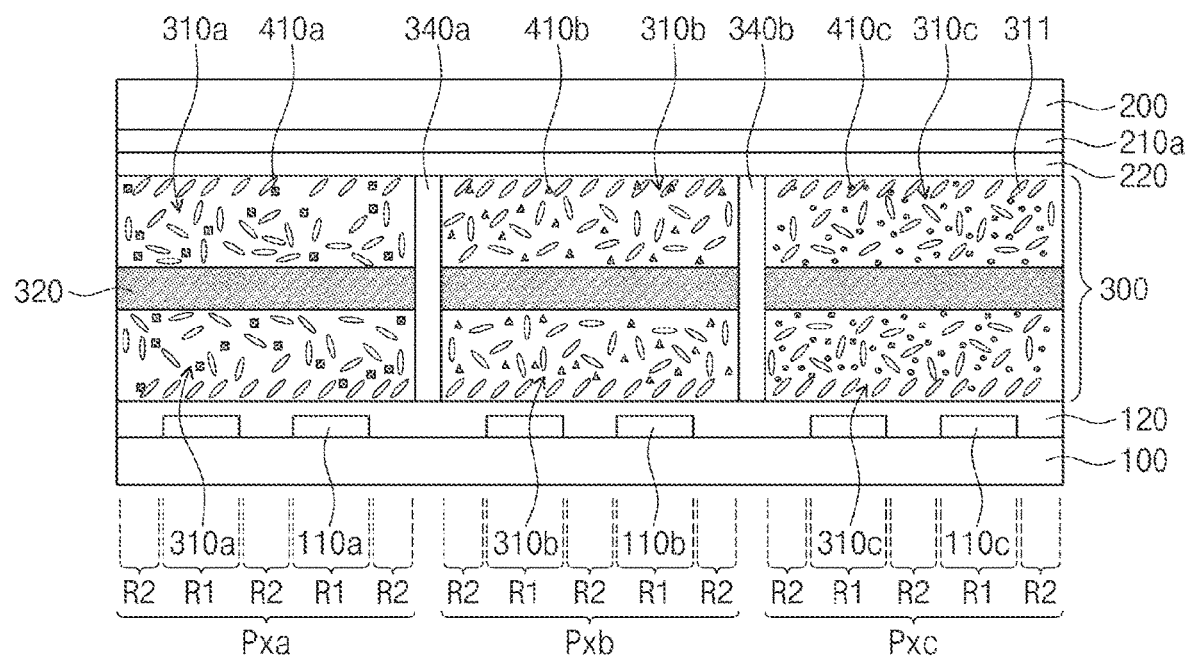
FIG. 11 is a cross-sectional view of a liquid crystal device according to embodiments of the inventive concept.

FIG. 11 is a cross-sectional view of a liquid crystal device according to embodiments of the inventive concept.

Referring to FIG. 11, in a liquid crystal device 17 according to this embodiment, a plurality of first pixel electrodes 110a, which are spaced apart from each other, may be disposed in a first pixel region Pxa. A plurality of second pixel electrodes 110b, which are spaced apart from each other, may be disposed in a second pixel region Pxb. A plurality of third pixel electrodes 110c, which are spaced apart from each other, may be disposed in a third pixel region Pxc. Other configurations may be same as or similar to those that have been described with reference to FIG. 5, and thus further description will be omitted herein.

Figure 12:
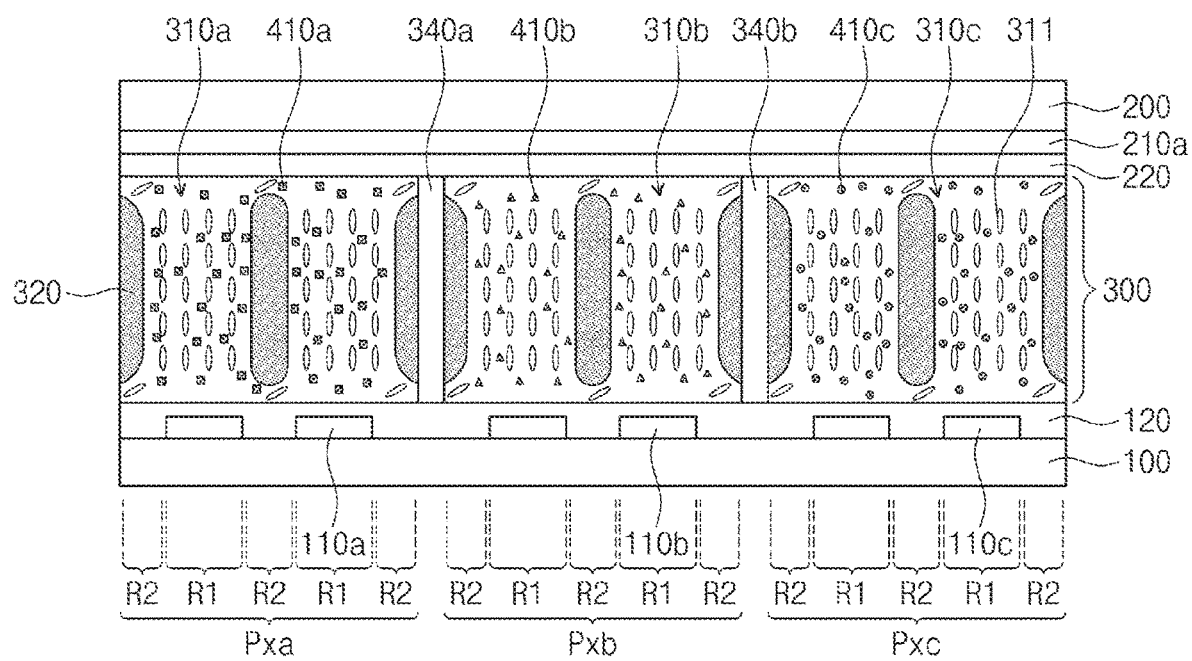
FIG. 12 is a view illustrating an operation method of the liquid crystal device of FIG. 11.

FIG. 12 is a view illustrating an operation method of the liquid crystal device of FIG. 11.

Referring to FIG. 12, when a voltage is applied to the common electrode 210a and the first to third pixel electrodes 110a, 110b and 110c, the liquid crystal molecules 311 are vertically aligned between the first to third pixel electrodes 110a, 110b and 110c, and the hydrophobic portion 320 moves toward the partitions 340a and 340b. Thus, a portion of the hydrophobic portion 320 is adjacent to the partitions 340a and 340b, and the other portion of the hydrophobic portion 320 may be positioned between the first pixel electrodes 110a, between the second pixel electrodes 110b, and between the third pixel electrodes 110c.

Figure 13:
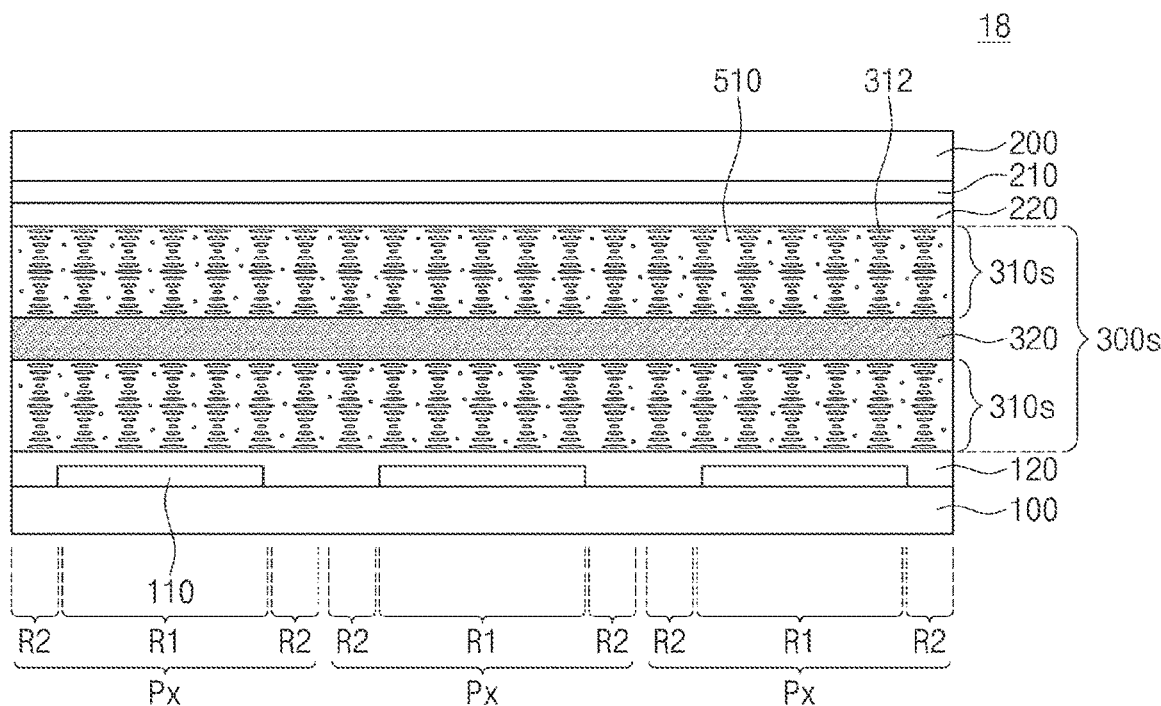
FIG. 13 is a cross-sectional view of a liquid crystal device according to embodiments of the inventive concept.

FIG. 13 is a cross-sectional view of a liquid crystal device according to embodiments of the inventive concept.

Referring to FIG. 13, a liquid crystal device according to this embodiment may be configured such that the liquid crystal portion 310s in the liquid crystal device 13 as shown in FIG. 4B further includes an optical active agent 510. Liquid crystal molecules 312 included in the liquid crystal portion 310s may be cholesteric liquid crystal molecules. The nematic liquid crystal molecules 311 in FIG. 1B may have a spiral structure having a predetermined cycle by addition of the optical active agent 510, and may thus be changed to cholesteric liquid crystal molecules. The liquid display device 18 in FIG. 13 may be a cholesteric liquid crystal display. The phase transition temperature ($T_{NT}$) of the liquid crystal molecules may be high, and preferably be 60-150° C. in consideration of a usage range. A liquid crystal layer 300s includes a hydrophobic portion 320 as well as the liquid crystal portion 310s. The hydrophobic portion 320 may be same as or similar to that described with reference to FIG. 4A. Hydrophobic materials may have a dielectric anisotropy of ½0 to ⅕ of the dielectric anisotropy of the liquid crystal molecules 312. The hydrophobic materials may have a molecular weigh of 300 to 5,000. The refractive index of the hydrophobic portion 320 may be 1.25 to 1.45. In this embodiment, the liquid crystal layer 300s may be named a cholesteric liquid crystal layer 300s. A mass ratio of the liquid crystal portion 310s to the hydrophobic portion 320 in the liquid crystal device 18 may be 99:1 to 10:90, or preferably 90:10 to 50:50.

The optical active agent 510 is mixed with the liquid crystal molecules 312 in the liquid crystal portion 310s but is not dissolved with the hydrophobic portion 320. The optical active agent 510 has a structure of Chemical Formula 5.

<Chemical Formula 5>

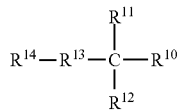

In Chemical Formula 5, $R^m$ is hydrogen, a methyl group or an ethyl group, $R^{11}$ is a hexyl group ($C_6H_{13}$), OCO, an aromatic group or an alicyclic group, $R^{12}$ is hydrogen, a methyl group, an ethyl group or argon, $R^{13}$ is CONH, COO, CN or OCO, and $R^{14}$ has a structure of X—B-A- where A and B are each independently a substitutable aromatic group or alicyclic group, and X is a linear, branched or cyclic aliphatic compound having 2-7 carbon atoms. The optical active agent 510 may be included in an amount of 0.1-50 wt % with respect to the total weight of the liquid crystal molecules 312.

Other configurations may be same or similar to that described with reference to FIG. 1A.

Figure 14:
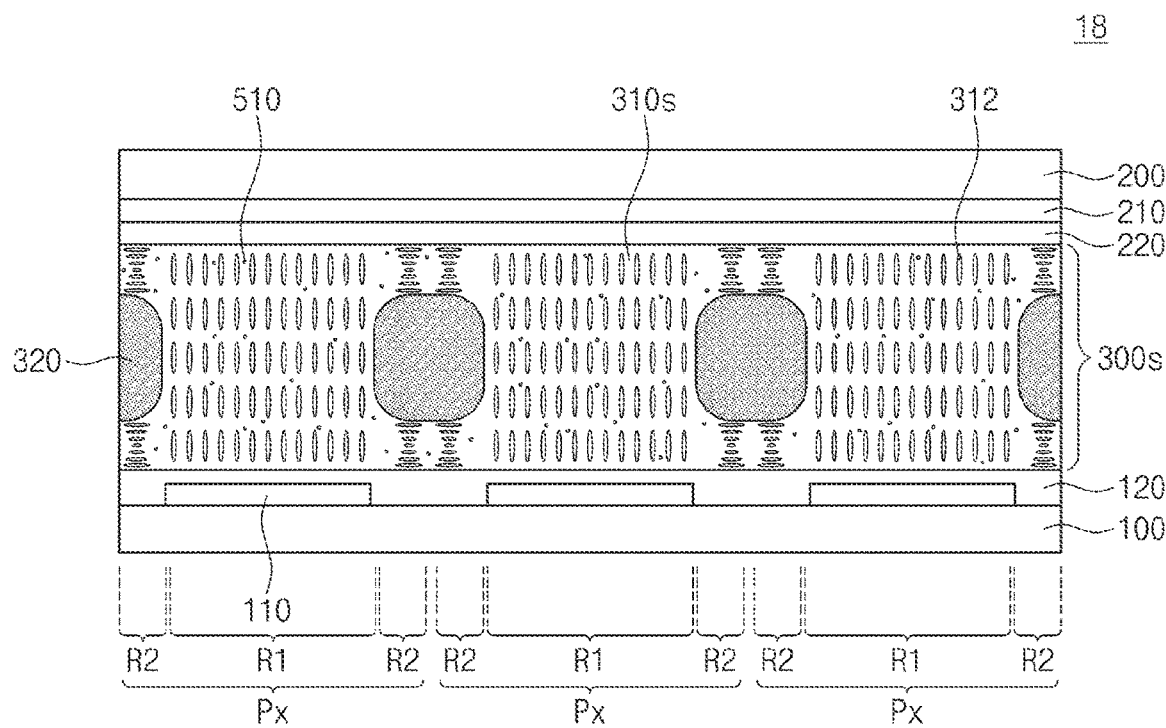
FIG. 14 illustrates an operation method of the liquid crystal device of FIG. 13.

FIG. 14 illustrates an operation method of the liquid crystal device of FIG. 13.

Referring to FIG. 14, when a voltage is applied to the first electrodes 110 and the second electrode 210, an electric field is formed in the liquid crystal layer 300s, and the cholesteric liquid crystal molecules 312 having a relatively high dielectric constant are re-aligned to allow the hydrophobic portion 320 to move toward the second region R2. Here, even when the hydrophobic portion 320 moves toward the second region R2, the cholesteric liquid crystal molecules 312 having a spiral structure still remain at the interface with the alignment films 120 and 220, so that a selective reflected color having a specific wavelength continues to be seen in a region where the electric filed is not applied, and the cholesteric liquid molecules 312 are changed to a homeotropic state from a planar or focal conic state to become transparent in a region between the common electrode 210a and the first to third pixel electrodes 110a, 110b and 110c.

Since the spiral structure of the cholesteric liquid crystal molecules have a strong binding force between the liquid crystal molecules 312, an extremely high driving voltage is required for the electric field to change the alignment direction of the spiral structure or to change into a homeotropic state. However, in the embodiments of the inventive concept, the volume of the liquid crystal portion 310s occupying in the liquid crystal layer 300s may be reduced due to the hydrophobic portion 320. In addition, when a voltage is not applied to the first electrode 110 and the second electrode 210, the hydrophobic portion 320 is interposed between the liquid crystal portions 310s to divide the liquid crystal portion 310s into two sections, so that an electric field is applied in a state in which the thickness of the liquid crystal portion 310s is decreased, and one side of the interface of the liquid crystal portion 310s is in contact with the hydrophobic portion 320 to make it possible to change the cholesteric liquid crystal molecules 312 into a homeotropic state even with a small electric field. Accordingly, the driving voltage for the liquid crystal device 18 may be reduced. Therefore, the cholesteric liquid crystal display according to the embodiments of the inventive concept may be operated under a low driving voltage without changing a cell gap, a material, and a process in typical liquid crystal devices. Thus, it is also possible to actively operate the cholesteric liquid crystal display or operate in a low temperature range on a plastic substrate. Also, since a fluorine-based liquid material constituting the hydrophobic portion 320 has an extremely lower dielectric constant than liquid crystal molecules, there is no physical change caused by the electric field. Furthermore, the fluorine-based liquid material is inexpensive and highly transparent, and thus does not affect the price and reliability of a liquid crystal display. Moreover, the hydrophobic portion has a low-dielectric characteristic and is thus capable of minimizing the interference between the liquid crystal molecules, thereby achieving an ultra-high-resolution cholesteric liquid display in which a liquid crystal pitch is remarkably decreased (pixel pitch of 2 µm or less).

Figure 15:
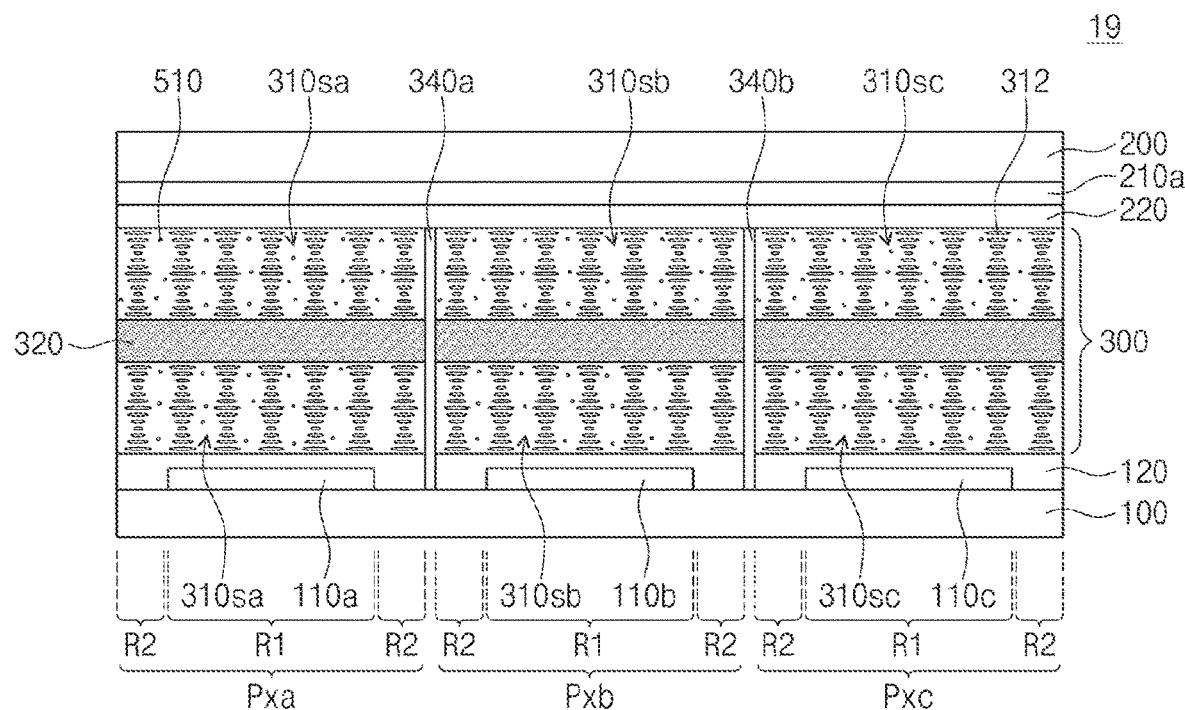
FIG. 15 is a cross-sectional view of a liquid crystal device according to embodiments of the inventive concept.

FIG. 15 is a cross-sectional view of a liquid crystal device according to embodiments of the inventive concept.

Referring to FIG. 15, a first substrate 100 of this liquid crystal element 19 may have a plurality of pixel regions Pxa, Pxb, and Pxc in a plan view as in FIG. 4A. The pixel regions Pxa, Pxb, and Pxc may include a first pixel region Pxa, a second pixel region Pxb, and a third pixel region Pxc. Each of the pixel regions Pxa, Pxb, and Pxc may include a first region R1 and a second region R2. In each of the pixel regions Pxa, Pxb, and Pxc, the second region R2 may surround the first region. A first pixel electrode 110a may be disposed on the first substrate 100 in the first pixel region Pxa. A second pixel electrode 110b may be disposed on the first substrate 100 in the second pixel region Pxb. A third pixel electrode 110c may be disposed on the first substrate 100 in the third pixel region Pxc.

A first alignment film 120 may be disposed on the first to third pixel electrodes 110a, 110b and 110c. The first alignment film 120 may cover the second region R2 of the first substrate exposed between the first to third pixel electrodes 110a, 110b and 110c. A second alignment film 220 may be vertically spaced from the first alignment film 120. A common electrode 210a may be provided on the second alignment film 220. The common electrode 210a may overlap the first region R1 and the second region R2 of the first substrate 100 in a plan view. The common electrode 210a may be transparent. The common electrode 210a may include a transparent conductive oxide such as indium tin oxide (ITO) or indium zinc oxide (IZO).

The second substrate 200 may be disposed on the common electrode 210a. The second substrate 200 may include an organic matter or an inorganic matter. The common electrode 210a may overlap the first to third pixel electrodes 110a, 110b and 110c. A liquid crystal layer 300 may be interposed between the first alignment film 120 and the second alignment film 220. A first partition 340a may penetrate the liquid crystal layer 300 between the first pixel region Pxa and the second pixel region Pxb to divide the liquid crystal layer 300 into a first pixel liquid crystal portion 310sa and a second pixel liquid crystal portion 310sb. A second partition 340b may penetrate the liquid crystal layer 300 between the second pixel region Pxb and the third pixel region Pxc to divide the liquid crystal layer 300 into the second pixel liquid crystal portion 310sb and a third pixel liquid crystal portion 310sc. The liquid crystal layer 300 includes hydrophobic portions which are phase-separated from the pixel liquid crystal portions 310sa, 310sb and 310sc. The first partition 340a and the second partition 340b may be formed of a polymer material.

The pixel liquid crystal portions 310sa, 310sb and 310sc each may include liquid crystal molecules 312 and an optical active agent 510. The liquid crystal molecules 312 may be changed to cholesteric liquid crystal molecules by addition of the optical active agent 510. The description for the optical active gent 510 may be same as or similar to that described with reference to FIG. 13. The optical active agent 510 may differ in concentration in each of the pixel liquid crystal portions 310sa, 310sb and 310sc. For example, in the pixel region having red, blue and green colors, the optical active agent 510 in the red pixel region has the lowest concentration, and the optical active agent 510 in the blue pixel region has the highest concentration. The optical active agent 510 in the green pixel region may have a concentration that is higher than the concentration in the red pixel region and lower than the concentration in the blue pixel region. One of the first to third pixel region Pxa, Pxb and Pxc may be the red pixel region, another one may be the blue pixel region, and the remaining one may be the green pixel region.

Figure 16:
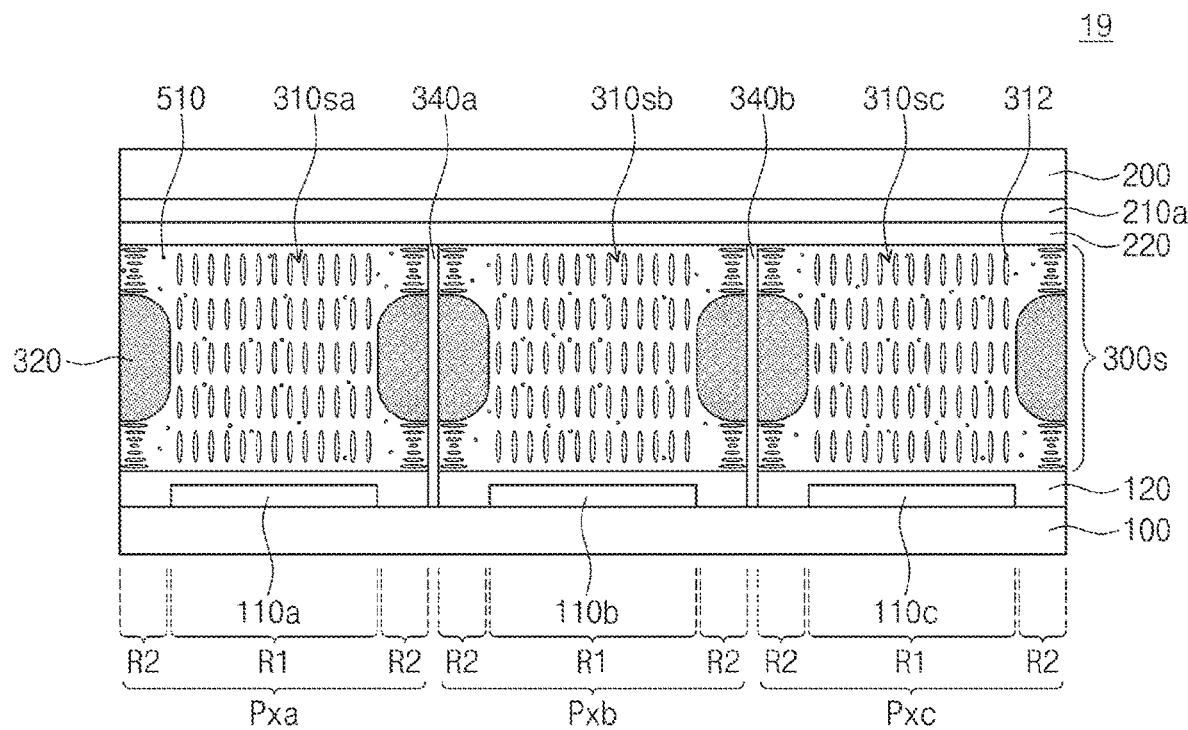
FIG. 16 illustrates an operation method of a liquid crystal device of FIG. 15.

FIG. 16 illustrates an operation method of a liquid crystal device of FIG. 15.

Referring to FIG. 16, when a voltage is applied to the common electrode 210a and the first to third pixel electrodes 110a, 110b and 110c, an electric field is formed in the liquid crystal layer 300s and the cholesteric liquid crystal molecules 312 having a relatively high dielectric constant are re-aligned to allow the hydrophobic portion 320 to move toward the second region R2 and be adjacent to the partitions 340a and 340b. Here, the alignment characteristics of the liquid crystal molecules 312 may be adjusted depending on the concentration of the optical active agent 510. As described with reference to FIG. 13, according to the liquid crystal device 13, low-voltage driving characteristics are exhibited, a highly transparent display may be achieved without using a color filter or polarization plate which causes optical loss, optical loss may be reduced. Therefore, the liquid crystal device 13 is applicable to various fields.

Figure 17:
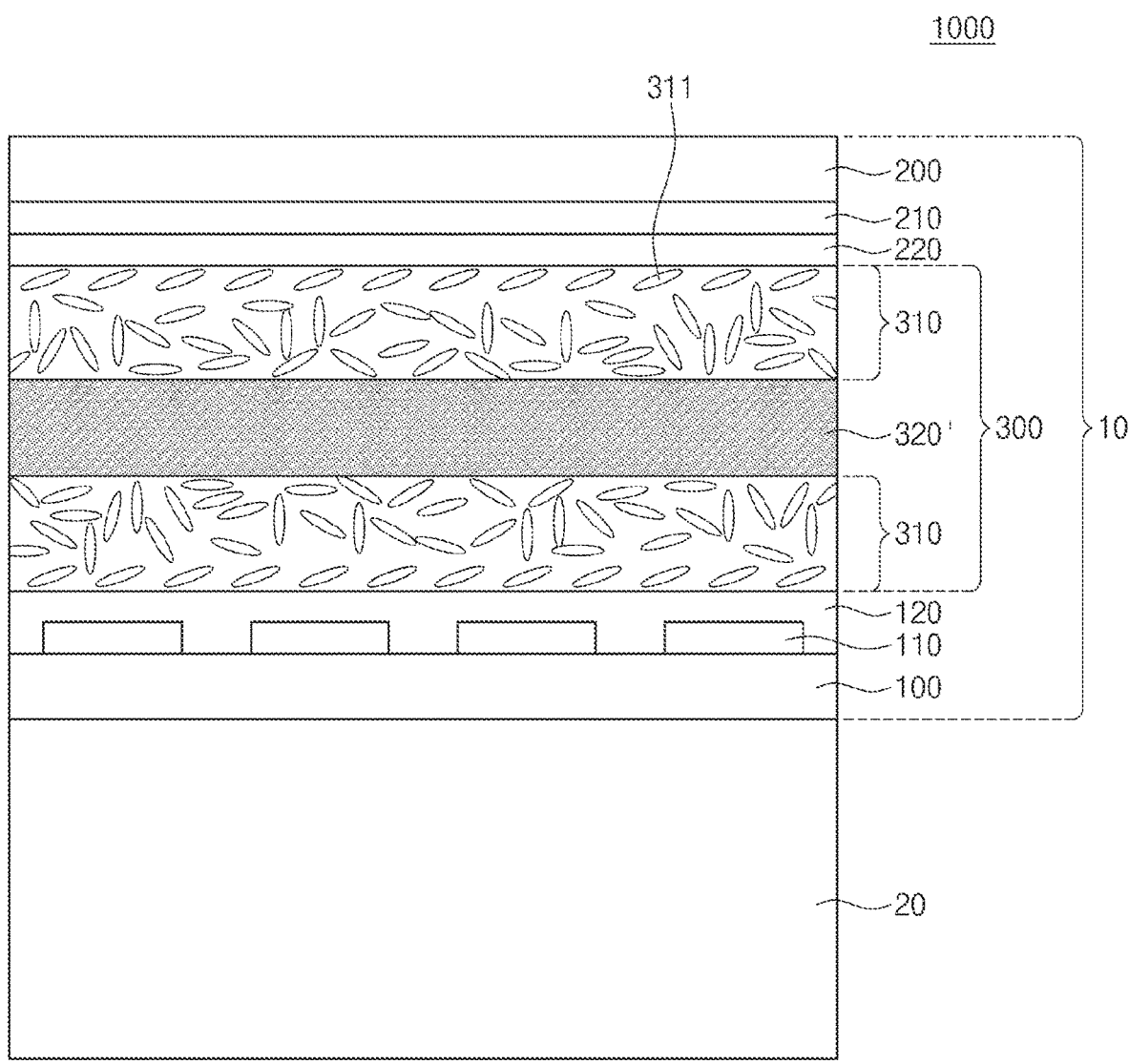
FIG. 17 is a cross-sectional view showing a display device according to the embodiments.

FIG. 17 is a cross-sectional view showing a display device according to the embodiments. Hereinafter, the contents overlapping with those described above will be omitted.

Referring to FIG. 17, the display device 1000 may include a light emitting element 20 and a liquid crystal device 10. The light emitting element 20 may emit light to the liquid crystal device 10.

The liquid crystal device 10 may be provided on the light emitting element 20. The liquid crystal device 10 may include the liquid crystal device 13 of FIGS. 4A and 4B. In this case, the operation method of the liquid crystal device 10 may be substantially the same as that described in the operation of the liquid crystal device 13 of FIGS. 4A to 5B. Unlike what is shown, the liquid crystal device 10 may be the liquid crystal device 11 described with reference to FIGS. 1A and 1B, and in this case, the operation method of the liquid crystal device 10 may be substantially the same as that described in the operation of the liquid crystal device 11 of FIGS. 1A to 2B. As another example, the liquid crystal device 10 may be the same as the liquid crystal devices in FIGS. 3, 6, 7, 8, 9, 11, 13 AND 15.

The display device 1000 may function as a hologram display device. The light emitting element 20 may include a backlight unit. The liquid crystal device 10 may function as a light modulator. The display device 1000 is not limited to the hologram display device, and may be applied to various fields.

According to the inventive concept, during the operation of the liquid crystal device, the hydrophobic portion of the liquid crystal layer may function as partitions partitioning the pixel regions. The interference between liquid crystal molecules in different pixel regions may be reduced/prevented. Even if the pixel regions have fine pitches, the hydrophobic portion may prevent/reduce the occurrence of crosstalk between the pixel regions. Accordingly, the resolution of the liquid crystal device may be improved.

Since the hydrophobic portion partitions the liquid crystal portions, a separate partition may not be provided in the liquid crystal layer. Accordingly, the liquid crystal layer may be miniaturized. The partition forming process may be omitted, so that the production of the liquid crystal device may be further simplified.

Also, according to the exemplary embodiments of the inventive concept, the liquid crystal layer or the hydrophobic layer include dyes, and thus a color filer may not be separately required.

In addition, a liquid crystal device according to the exemplary embodiments of the inventive concept has a small volume occupied by the liquid crystal portion due to the hydrophobic portion, thereby reducing the thickness of the liquid crystal portion and lowering a driving voltage.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A liquid crystal device comprising:
a first substrate and a second substrate facing each other;
a first electrode disposed between the first substrate and the second substrate and adjacent to the first substrate;
a second electrode disposed between the first substrate and the second substrate and adjacent to the second substrate;
a first alignment film disposed between the first electrode and the second electrode and adjacent to the first electrode;
a second alignment film disposed between the first electrode and the second electrode and adjacent to the second electrode; and
a liquid crystal layer disposed between the first alignment film and the second alignment film,
wherein
the liquid crystal layer includes a liquid crystal portion containing liquid crystal molecules, and a hydrophobic portion containing a hydrophobic material,
the liquid crystal portion and the hydrophobic portion are phase-separated from each other,
the hydrophobic portion contains fluorine, and
the hydrophobic portion and the liquid crystal portion are configured to, in response to a voltage applied to the first electrode and the second electrode, change from
a state in which the liquid crystal portion is divided by the hydrophobic portion into a first liquid crystal portion adjacent to the first alignment film and a second liquid crystal portion adjacent to the second alignment film, to
a state in which the liquid crystal molecules are vertically aligned between the first electrode and the second electrode, and the liquid crystal portion is positioned between the first electrode and the second electrode and not separated into the first liquid crystal portion and the second liquid crystal portion by the hydrophobic portion.

2. The liquid crystal device of claim 1, wherein the hydrophobic material has a molecular weight of 300-5,000.

3. The liquid crystal device of claim 1, further comprising a dye included in the liquid crystal portion or the hydrophobic portion.

4. The liquid crystal device of claim 3, wherein the dye has an aromatic ring or a condensed ring.

5. The liquid crystal device of claim 1, wherein the liquid crystal portion further includes a dye,
the dye having a yellow color, and having a structure of Chemical Formula 1 below, <Chemical Formula 1>

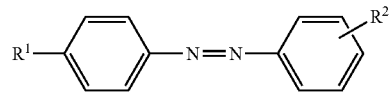

in Chemical Formula 1, $R^1$ is $N(C_nH_{2n+1})$ where n is an integer of 1 or more, and $R^2$ is hydrogen, a methyl group, an ethyl group, a linear or branched alkyl group having three or more carbon atoms, an alkenyl group having three or more carbon atoms, or an aromatic group.

6. The liquid crystal device of claim 1, wherein the liquid crystal portion further includes a dye,
the dye having a magenta color, and having a structure of Chemical Formula 2 below, <Chemical Formula 2>

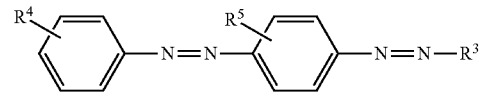

wherein $R^4$ and $R^5$ are each independently one of hydrogen, a methyl group, an ethyl group, a linear or branched alkyl group having three or more carbon atoms, an alkenyl group having three or more carbon atoms, or an aromatic group, and wherein $R^3$ is one of the following chemical formulas corresponding to a <Chemical Formula 3>

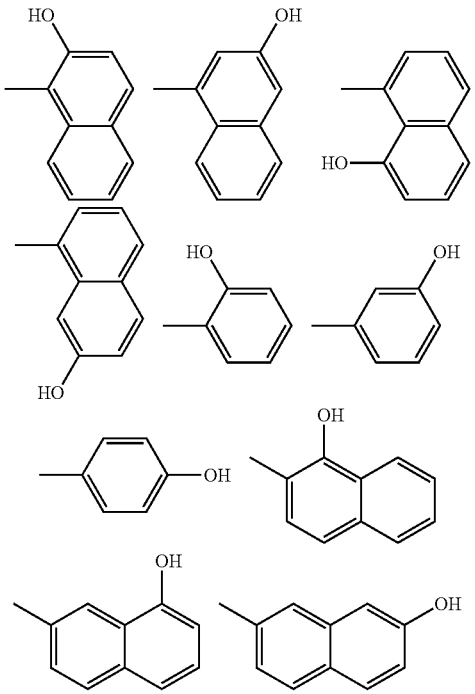

-continued

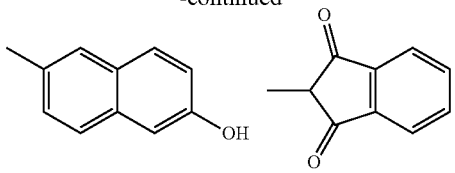

7. The liquid crystal device of claim 1, wherein the liquid crystal portion further includes a dye,
the dye having a cyan color, and having a structure of Chemical Formula 4 below, <Chemical Formula 4>

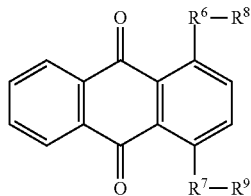

wherein, $R^6$ and $R^7$ are each independently one selected from a group consisting of oxygen, sulfur, selenium, a methylene group, —NH—, and an ester group, and
$R^8$ and $R^9$ are each independently one of hydrogen, a methyl group, an ethyl group, a propyl group, a butyl group, a pentyl group, a linear or branched alkyl group having six or more carbon atoms, a linear or branched alkenyl group having three or more carbon atoms, or an aromatic group.

8. The liquid crystal device of claim 1, wherein the liquid crystal portion further includes a dye,
the dye being included in an amount of 0.001-5 wt % with respect to the total weight of the liquid crystal molecules.

9. The liquid crystal device of claim 1, wherein the first electrode includes a first pixel electrode, a second pixel electrode and a third pixel electrode, which are spaced apart from each other on the same plane,
the liquid crystal device further comprising:
a first partition configured to penetrate the liquid crystal layer between the first pixel electrode and the second pixel electrode to divide the liquid crystal portion of the liquid crystal layer into a first pixel liquid crystal portion and a second pixel liquid crystal portion; and
a second partition configured to penetrate the liquid crystal layer between the second pixel electrode and the third pixel electrode to divide the liquid crystal portion of the liquid crystal layer into the second pixel liquid crystal portion and a third pixel liquid crystal portion.

10. The liquid crystal device of claim 9, wherein the liquid crystal device further comprises:
a first dye included in the first pixel liquid crystal portion;
a second dye included in the second pixel liquid crystal portion; and
a third dye included in the third pixel liquid crystal portion,
the first to third dyes being different from each other.

11. The liquid crystal device of claim 9, wherein the first to third pixel liquid crystal portions respectively include optical active agents having different concentrations.

12. The liquid crystal device of claim 1, wherein the liquid crystal portion further includes an optical active agent,
the optical active agent having a structure of Chemical Formula 5 below, <Chemical Formula 5>

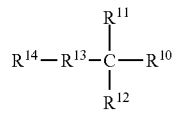

(in Chemical Formula 5,
$R^{10}$ is hydrogen, a methyl group or an ethyl group,
$R^{11}$ is a hexyl group ($C_6H_{13}$), OCO, an aromatic group or an alicyclic group,
$R^{12}$ is hydrogen, a methyl group, an ethyl group or argon,
$R^{13}$ is CONH, COO, CN or OCO, and
$R^{14}$ has a structure of X—B-A- where A and B are each independently a substitutable aromatic group or alicyclic group, and X is a linear, branched or cyclic aliphatic compound having 2-7 carbon atoms).

13. The liquid crystal device of claim 12, wherein the optical active agent is included in an amount of 0.1-50 wt % with respect to the total weight of the liquid crystal molecules.

14. The liquid crystal device of claim 12, wherein the aromatic group is at least one selected from the group consisting of a phenyl group, a naphthyl group, an anthryl group, a phenanthryl group, a heteroaromatic ring residue, or is obtained by substituting a portion thereof with at least one selected from the group consisting of a methyl group, an ethyl group, a n-propyl group, fluorine, chlorine, bromine, $CF_3$ and $CCl_3$.

15. The liquid crystal device of claim 1, wherein the hydrophobic portion has a lower dielectric constant than the liquid crystal portion.

16. An operation method of a liquid crystal device comprising a first electrode, a liquid crystal layer, and a second electrode, which are stacked on a substrate,
wherein the substrate has a plurality of pixel regions,
each of the pixel regions comprises a first region overlapping the first electrode and a second region spaced from the first electrode in a plan view, and
the liquid crystal layer comprises a liquid crystal portion including liquid crystal molecules and a hydrophobic portion that are phase-separated from each other and,
wherein the method comprises:
forming a first layer of the liquid crystal portion and a second layer of the hydrophobic portion at both the first region and the second region of the substrate; and
moving the hydrophobic portion from the first region to the second region of the substrate.

17. The method of claim 16, wherein the moving of the hydrophobic portion from the first region of the substrate comprises generating a voltage difference between the first electrode and the second electrode.

18. The method of claim 17, wherein the moving of the hydrophobic portion from the first region of the substrate further comprises aligning the liquid crystal molecules by the voltage difference.

* * * * *